US012522320B2

(12) United States Patent
Vigen et al.

(10) Patent No.: US 12,522,320 B2
(45) Date of Patent: Jan. 13, 2026

(54) STEERING SYSTEMS FOR SNOWMOBILES

(71) Applicant: Arctic Cat Inc., Thief River Falls, MN (US)

(72) Inventors: David L. Vigen, Thief River Falls, MN (US); Benjamin Taylor Langaas, Thief River Falls, MN (US); Guy L. Sibilleau, Roseau, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 430 days.

(21) Appl. No.: 18/230,802

(22) Filed: Aug. 7, 2023

(65) Prior Publication Data
US 2024/0083545 A1    Mar. 14, 2024

Related U.S. Application Data

(60) Provisional application No. 63/528,375, filed on Jul. 22, 2023, provisional application No. 63/404,731, filed on Sep. 8, 2022.

(51) Int. Cl.
*B62M 27/00* (2006.01)
*B62M 27/02* (2006.01)

(52) U.S. Cl.
CPC ....... *B62M 27/02* (2013.01); *B62M 2027/023* (2013.01); *B62M 2027/025* (2013.01); *B62M 2027/028* (2013.01)

(58) Field of Classification Search
CPC ............ B62M 27/02; B62M 2027/023; B62M 2027/025; B62M 2027/028
See application file for complete search history.

(56) References Cited

U.S. PATENT DOCUMENTS

| | | | | |
|---|---|---|---|---|
| 3,882,948 A | * | 5/1975 | Southiere | B62M 27/02 180/21 |
| 4,364,447 A | * | 12/1982 | Yoshida | B62B 13/10 280/21.1 |
| 5,660,245 A | * | 8/1997 | Marier | B62M 27/02 180/190 |
| 6,655,487 B2 | * | 12/2003 | Mallette | B62J 35/00 280/124.128 |
| 7,096,988 B2 | | 8/2006 | Moriyama | |
| 7,104,355 B2 | | 9/2006 | Hoi | |
| 7,213,669 B2 | | 5/2007 | Fecteau et al. | |
| 7,353,899 B2 | | 4/2008 | Abe et al. | |

(Continued)

*Primary Examiner* — Zakaria Elahmadi
(74) *Attorney, Agent, or Firm* — Lawrence Youst PLLC

(57) ABSTRACT

A steering system for a snowmobile includes a handlebar assembly and a steering column that has an upper end coupled to the handlebar assembly. An electronic steering assist unit is coupled to the steering column between upper and lower posts of the steering column. A steering arm assembly is coupled to a lower end of the lower post. First and second tie rods respectively couple the steering arm assembly to first and second ski assemblies such that turning the handlebar assembly, together with the assistance of the electronic steering assist unit, causes the ski assemblies to pivot. A floating mounting system couples the electronic steering assist unit to forward spars of the frame assembly to prevent a torque pre-load on the electronic steering assist unit. The steering column and the electronic steering assist unit share a common axis of rotation that is positioned along a centerline of the snowmobile.

20 Claims, 22 Drawing Sheets

(56) References Cited

U.S. PATENT DOCUMENTS

| | | | |
|---|---|---|---|
| 7,377,348 B2 | 5/2008 | Girouard et al. | |
| 7,401,816 B2 | 7/2008 | Abe et al. | |
| 7,413,046 B2 | 8/2008 | Okada et al. | |
| 7,475,751 B2 | 1/2009 | Pard et al. | |
| 7,530,422 B2 * | 5/2009 | Bolourchi | B62D 5/0472 |
| | | | 180/444 |
| 7,779,946 B2 | 8/2010 | Okada et al. | |
| 7,802,646 B2 | 9/2010 | Matsudo | |
| 7,806,215 B2 | 10/2010 | Codere et al. | |
| 8,235,164 B2 | 8/2012 | Okada et al. | |
| 8,408,348 B2 | 4/2013 | Nakamura et al. | |
| 8,430,197 B2 | 4/2013 | Matsudo | |
| 9,096,289 B2 * | 8/2015 | Hedlund | B62D 55/104 |
| 9,694,872 B2 * | 7/2017 | Laroche | B62K 5/05 |
| 2003/0029659 A1 * | 2/2003 | Etou | B62M 27/02 |
| | | | 180/190 |
| 2003/0029663 A1 * | 2/2003 | Etou | B62M 27/02 |
| | | | 180/312 |
| 2005/0039961 A1 * | 2/2005 | Moriyama | B62K 21/00 |
| | | | 180/190 |
| 2005/0252705 A1 * | 11/2005 | Abe | B62M 27/02 |
| | | | 180/190 |
| 2007/0284171 A1 * | 12/2007 | Okada | B62M 27/02 |
| | | | 180/182 |
| 2009/0152036 A1 * | 6/2009 | Okada | B62D 55/07 |
| | | | 180/190 |
| 2021/0323629 A1 * | 10/2021 | Blackburn | B62M 27/02 |

* cited by examiner

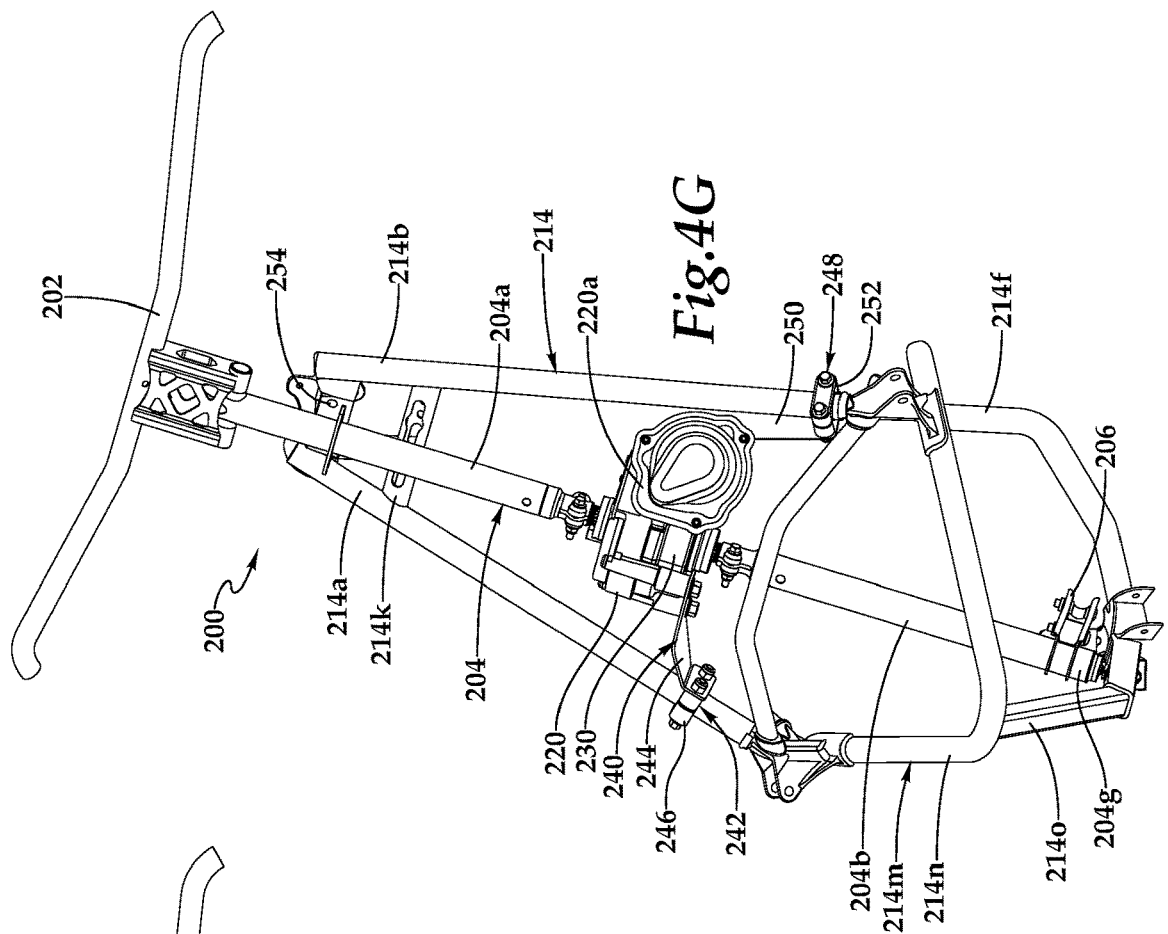
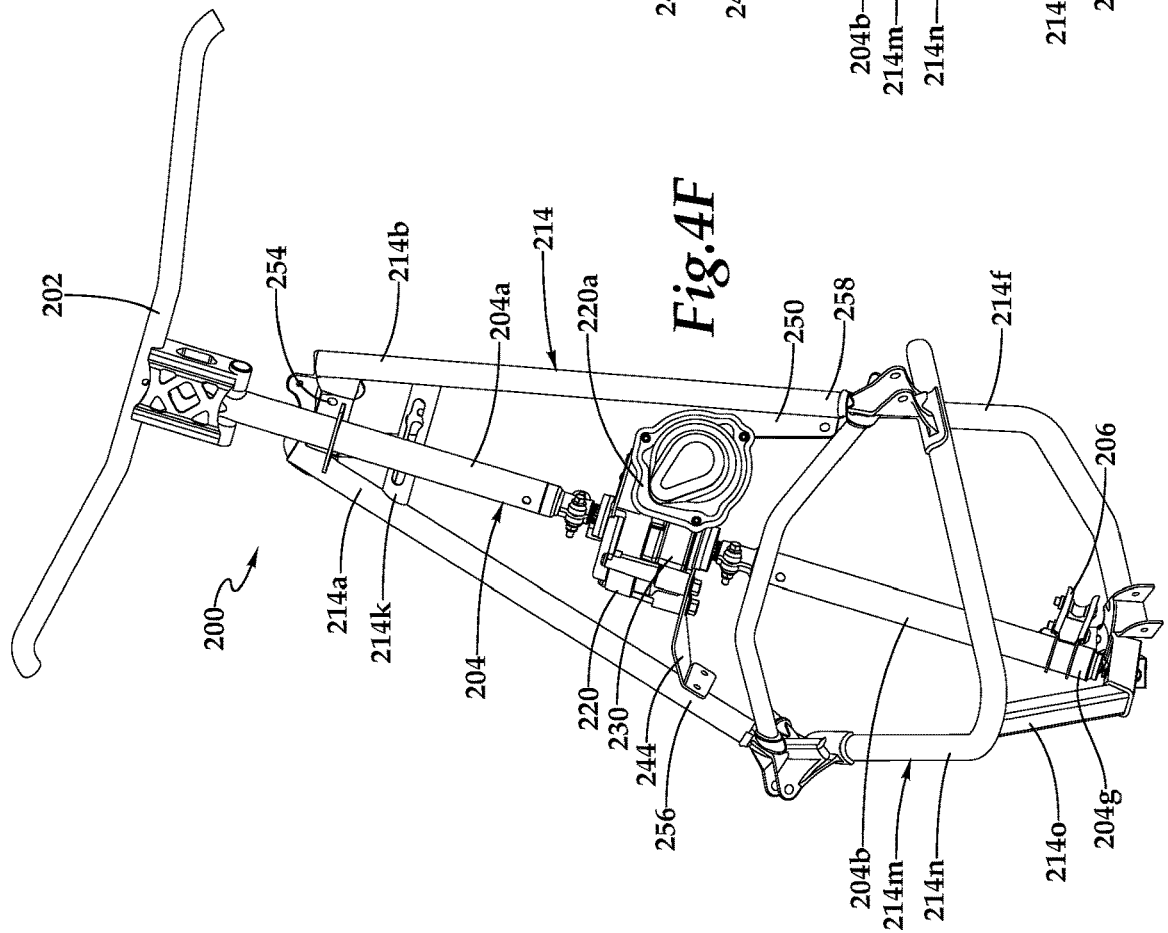

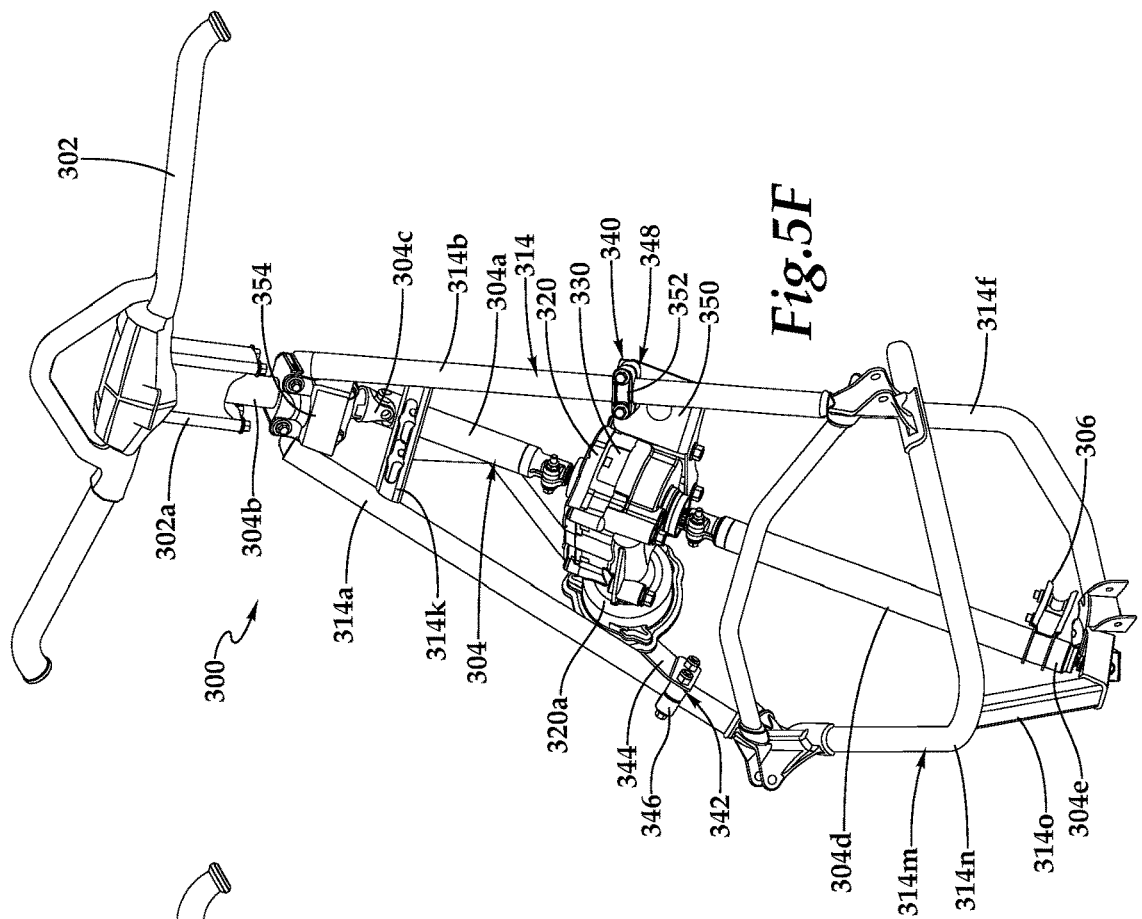
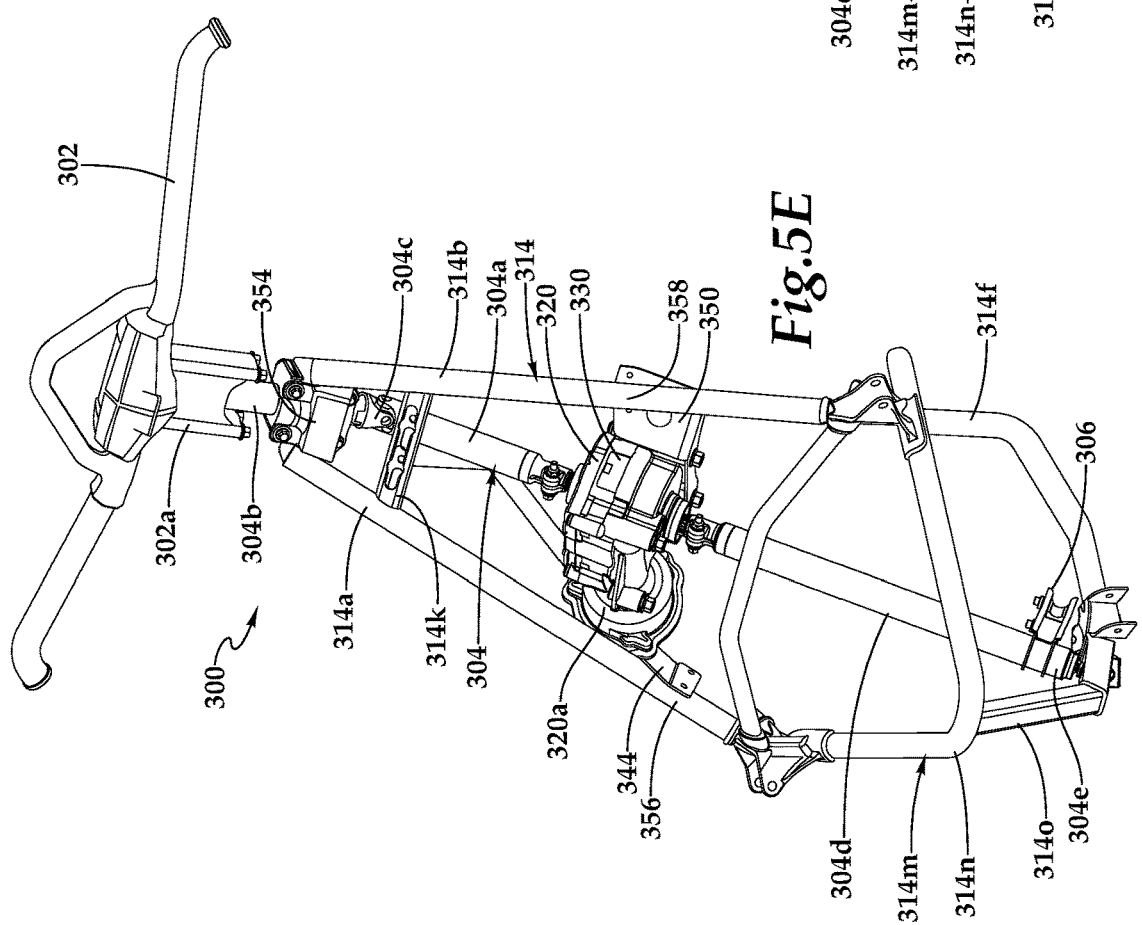

STEERING SYSTEMS FOR SNOWMOBILES

CROSS-REFERENCE TO RELATED APPLICATIONS

The present application claims the benefit of U.S. Provisional Application No. 63/404,731, filed Sep. 8, 2022 and U.S. Provisional Application No. 63/528,375, filed Jul. 22, 2023, the entire contents of each is hereby incorporated by reference.

TECHNICAL FIELD OF THE DISCLOSURE

The present disclosure relates, in general, to steering systems for use on land vehicles and, in particular, to steering systems for use on snowmobiles that include a steering column and an electronic steering assist unit that share a common axis of rotation that is positioned along the centerline of the snowmobile.

BACKGROUND

Snowmobiles are popular land vehicles used for transportation and recreation in cold and snowy conditions. Certain snowmobiles are designed for specific applications such as trail, utility, mountain, race and crossover, to name a few. Snowmobiles typically include a chassis that supports various components of the snowmobile such as an engine, a continuously variable transmission and a ground-engaging endless drive track disposed in a longitudinally extending drive tunnel. The engine and transmission power the drive track to enable ground propulsion for the vehicle. A rider controls the operation of the snowmobile using a steering system that typically includes a handlebar assembly, a steering column, a steering arm assembly, a pair of tie rods and a pair ski assemblies that provide flotation for the front of the snowmobile over the snow. Some snowmobiles utilize an articulated steering column in which multiple posts are routed around other snowmobile components using joints that allow for changes in direction. Other snowmobiles utilize a straight steering column that is routed not only downwardly and forwardly from the handlebar assembly but also laterally from the handlebar assembly to avoid other snowmobile components. Both the articulated steering columns and the laterally offset steering columns require additional linkages to return the steering system to the center of the snowmobile for proper operation of the tie rods and the ski assemblies. It has been found, however, that such steering systems for snowmobiles are overly complex and add unnecessary weight to the snowmobile. Accordingly, a need has arisen for improved steering systems for snowmobiles that overcome these and other drawbacks associated with the current steering systems.

SUMMARY

In a first aspect, the present disclosure is directed to a steering system for a snowmobile having a forward frame assembly with first and second forward spars. The steering system includes a handlebar assembly and a steering column having an upper end that is coupled to the handlebar assembly. The steering column includes upper and lower posts. An electronic steering assist unit is coupled to the steering column between the upper and lower posts. A steering arm assembly is coupled to a lower end of the lower post. A first tie rod has a proximal end coupled to the steering arm assembly and a distal end coupled to a first ski assembly. A second tie rod has a proximal end coupled to the steering arm assembly and a distal end coupled to a second ski assembly. A floating mounting system couples the electronic steering assist unit to the first and second forward spars. The floating mounting system is configured to prevent torque pre-load on the electronic steering assist unit. The steering column and the electronic steering assist unit share a common axis of rotation that is positioned along a centerline of the snowmobile.

In some embodiments, the steering column may be a straight steering column. In other embodiments, the steering column may be a bent steering column having a universal joint. In certain embodiments, the forward frame assembly may include an upper cross member and the steering column may be positioned forward of the upper cross member. In other embodiments, the forward frame assembly may include an upper cross member and the steering column may be positioned aft of the upper cross member. In some embodiments, the electronic steering assist unit may include an electric motor that may be positioned forward of the first and second forward spars. In other embodiments, the electric motor may be positioned aft of the first and second forward spars. In certain embodiments, the electronic steering assist unit may have an outer housing and the floating mounting system may prevent rotation of the outer housing relative to the first and second forward spars.

In some embodiments, the floating mounting system may include first and second floating clamp assemblies that respectively couple the electronic steering assist unit to the first and second forward spars at first and second nonpredetermined locations to allow the steering column to determine a vertical position of the electronic steering assist unit relative to the first and second forward spars. In such embodiments, the first floating clamp assembly may include a first bracket and a first clamp wherein, the first clamp may be coupled to the first forward spar at the first nonpredetermined location and the first bracket may be coupled between the first clamp and the electronic steering assist unit. Similarly, the second floating clamp assembly may include a second bracket and a second clamp wherein, the second clamp may be coupled to the second forward spar at the second nonpredetermined location and the second bracket may be coupled between the second clamp and the electronic steering assist unit. In certain embodiments, the first clamp may be positioned at a different vertical position than the second clamp. In some embodiments, the first and second clamps may be pillow block clamps.

In certain embodiments, the electronic steering assist unit may include an input shaft that is coupled to the upper post of the steering column and an output shaft that is coupled to the lower post of the steering column. In such embodiments, the input shaft of the electronic steering assist unit may have input splines and the upper post of the steering column may be coupled to the input splines with a splined coupler. Likewise, the output shaft of the electronic steering assist unit may have output splines and the lower post of the steering column may be coupled to the output splines with a splined coupler.

In a second aspect, the present disclosure is directed to a snowmobile that has a chassis including a forward frame assembly with first and second forward spars. An engine is coupled to the forward frame assembly. A steering column has an upper end that is coupled to a handlebar assembly. The steering column includes upper and lower posts. An electronic steering assist unit is coupled to the steering column between the upper and lower posts. A steering arm assembly is coupled to a lower end of the lower post. A first tie rod has a proximal end coupled to the steering arm assembly and a distal end coupled to a first ski assembly. A second tie rod has a proximal end coupled to the steering arm assembly and a distal end coupled to a second ski assembly. A floating mounting system couples the electronic steering assist unit to the first and second forward spars. The floating mounting system is configured to prevent torque pre-load on the electronic steering assist unit. The steering column and the electronic steering assist unit share a common axis of rotation that is positioned along a centerline of the snowmobile.

In some embodiments, the engine may be a two-stroke engine. In certain embodiments, the electronic steering assist unit may have an outer housing and the floating mounting system may prevent rotation of the outer housing relative to the first and second forward spars. In some embodiments, the floating mounting system may include first and second floating clamp assemblies that respectively couple the electronic steering assist unit to the first and second forward spars at first and second nonpredetermined locations to allow the steering column to determine a vertical position of the electronic steering assist unit relative to the first and second forward spars. In such embodiments, the first floating clamp assembly may include a first bracket and a first clamp wherein, the first clamp may be coupled to the first forward spar at the first nonpredetermined location and the first bracket may be coupled between the first clamp and the electronic steering assist unit. In addition, the second floating clamp assembly may include a second bracket and a second clamp wherein, the second clamp may be coupled to the second forward spar at the second nonpredetermined location and the second bracket may be coupled between the second clamp and the electronic steering assist unit.

In a third aspect, the present disclosure is directed to a snowmobile including a forward frame assembly. One or more ski assemblies are operably coupled to the forward frame assembly. A two-stroke engine is coupled to the forward frame assembly. A steering column is operably coupled to the forward frame and the one or more ski assemblies. The steering column is positioned along a centerline of the snowmobile. An electronic steering assist unit is coupled to the steering column and is positioned along the centerline of the snowmobile.

In certain embodiments, the forward frame assembly may include first and second forward spars and at least a portion of the electric steering assist unit may be positioned forward of the first and the second forward spars. In some embodiments, the forward frame assembly may include first and second forward spars and at least a portion of the electric steering assist unit may be positioned aft of the first and the second forward spars. In certain embodiments, the forward frame assembly may include first and second forward spars and the electric steering assist unit may be secured to the first and the second forward spars. In some embodiments, the two-stroke engine may be aftwardly tilted and the electronic steering assist unit may be positioned forward of the two-stroke engine. In certain embodiments, an upper A-arm may be operably coupled to the forward frame assembly at a forward mounting point and mounting point, a lower A-arm may be operably coupled to the forward frame assembly at a forward mounting point and mounting point and at least a portion of the electric steering assist unit may be positioned forward of the aftward mounting point of the lower A-arm. In addition, at least a portion of the electric steering assist unit may be positioned forward of the aftward mounting point of the upper A-arm.

In some embodiments, an exhaust pipe may include a first portion extending from a forward side of the two-stroke engine and between the first spar and the second spar to a point forward of the electric steering assist unit, a second portion that extends from the first portion outboard of the second spar and aftward of the electric steering assist unit and a third portion that extends from the second portion aftward of the electric steering assist unit and outboard of the first spar. In certain embodiments, an exhaust pipe may include a first portion extending from a forward side of the two-stroke engine and between the first spar and the second spar to a point forward of the electric steering assist unit, a second portion that extends from the first portion aftward of the electric steering assist unit and a third portion that extends from the second portion and is positioned aftward of the electric steering assist unit with the third portion positioned at least partially above the electric steering assist unit. In some embodiments, an exhaust manifold may extend from a forward side of the two-stroke engine and an exhaust pipe may include a first portion extending forward from the manifold and between the first spar and the second spar to a point forward of the electric steering assist unit, a second portion that extends aftward from the first portion along a first side of the centerline of the snowmobile and a third portion that extends from the second portion aftward of the electric steering assist unit to the second side of the centerline of the snowmobile with the electric steering assist unit positioned above the exhaust manifold. In certain embodiments, a muffler may be connected to the third portion of the exhaust pipe with the muffler secured to the forward frame assembly outboard of the first spar and a forwardmost portion of the muffler may be positioned forward of an aftwardmost portion of the electric steering assist unit.

In a fourth aspect, the present disclosure is directed to a snowmobile including a forward frame assembly. One or more ski assemblies are operably coupled to the forward frame assembly. A two-stroke engine is coupled to the forward frame assembly. A steering column is operably coupled to the forward frame and the one or more ski assemblies. An electronic steering assist unit is operably coupled to the steering column.

In some embodiments, an exhaust assembly extends from a forward side of the two-stroke engine and at least a portion of the exhaust assembly extends forward of the electric steering assist unit. In certain embodiments, the exhaust assembly may include an exhaust manifold secured to the two-stroke engine and an exhaust pipe extending from the exhaust manifold to a muffler. In such embodiments, the electric steering assist unit may be positioned above the exhaust manifold. In some embodiments, the forward frame assembly may include a first forward spar and a second forward spar with the muffler secured to the forward frame assembly outboard of the first spar. In such embodiments, a forwardmost portion of the muffler may be positioned forward of an aftwardmost portion of the electric steering assist unit. In certain embodiments, an upper A-arm may be operably coupled to the forward frame assembly at a forward mounting point and mounting point, a lower A-arm may be operably coupled to the forward frame assembly at a forward mounting point and mounting point and at least a portion of the electric steering assist unit may be positioned forward of the aftward mounting point of the lower A-arm. In addition, at least a portion of the electric steering assist unit may be positioned forward of the aftward mounting point of the upper A-arm. In some embodiments, at least a portion of the steering column may be positioned along a centerline of the snowmobile. In certain embodiments, the electronic steering assist unit may be positioned along the centerline of the snowmobile.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 4A-4G are schematic illustrations of a steering system for a snowmobile including an electronic steering assist unit in accordance with embodiments of the present disclosure; and FIGS. 5A-5F are schematic illustrations are schematic illustrations of a steering system for a snowmobile including an electronic steering assist unit in accordance with embodiments of the present disclosure.

DETAILED DESCRIPTION

Figure 1A:
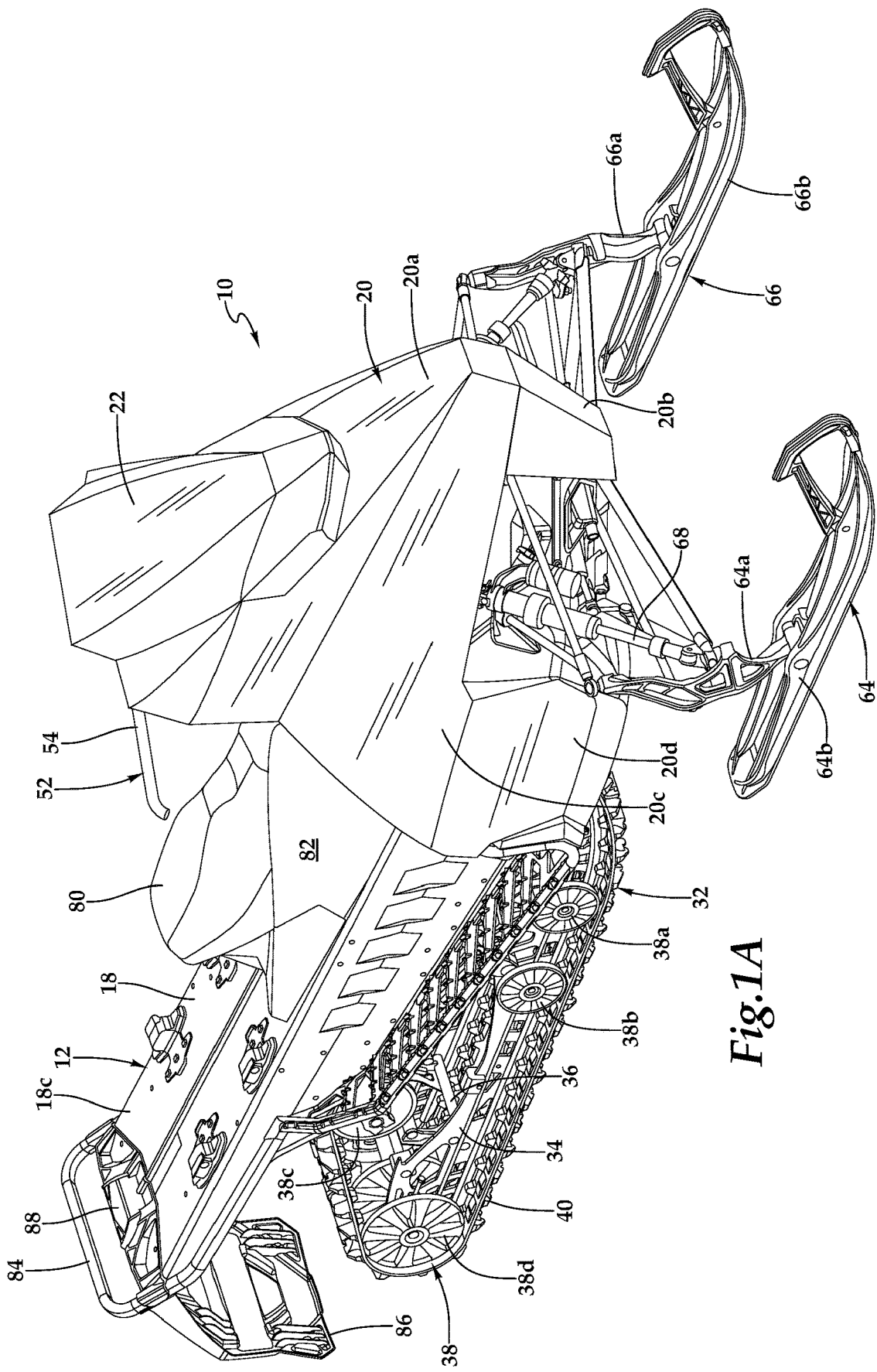
FIGS. 1A-1E are schematic illustrations of a snowmobile having a steering system including an electronic steering assist unit positioned along the centerline of the snowmobile in accordance with embodiments of the present disclosure.
Figure 1B:
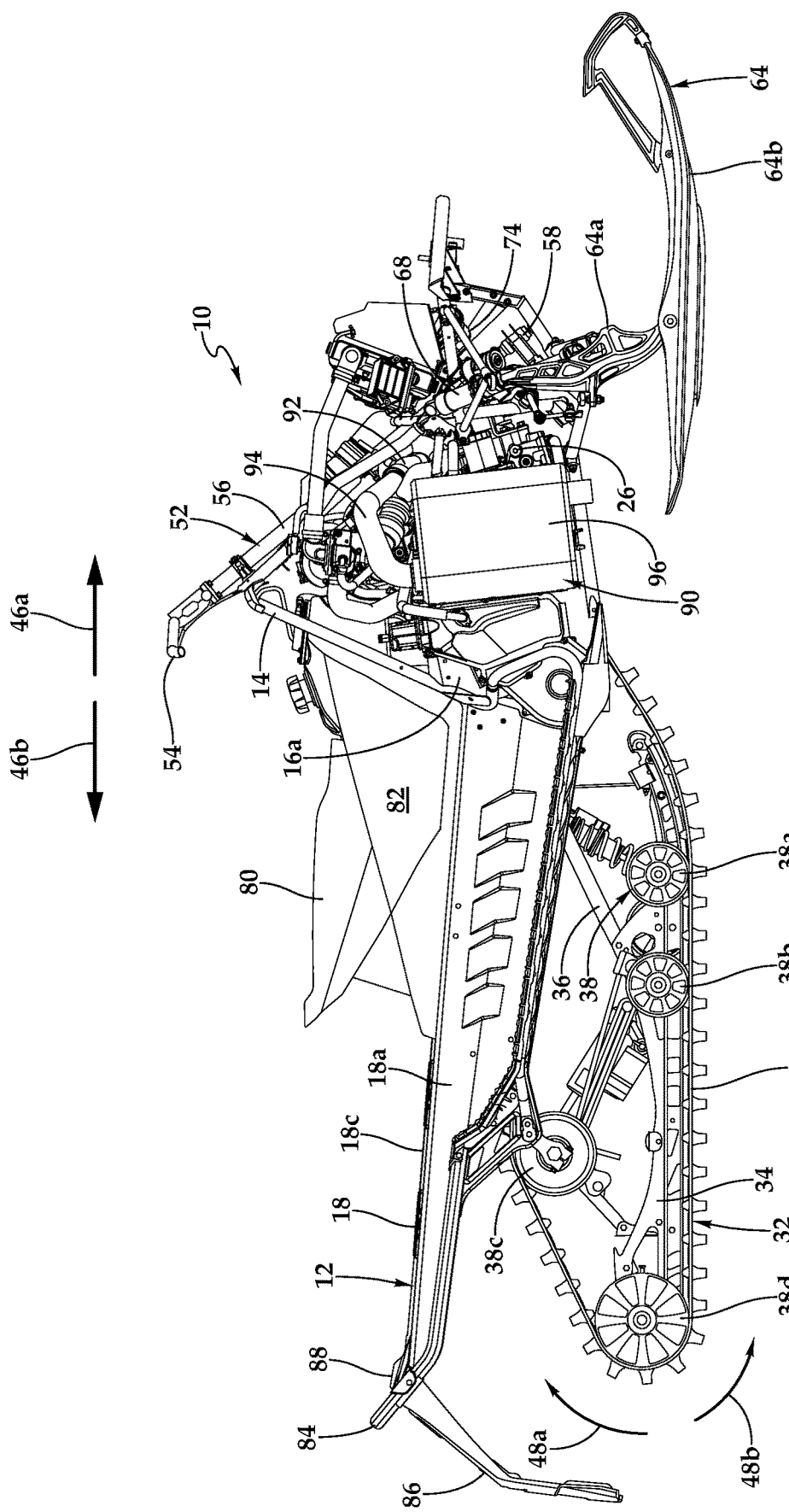
Figure 1C:
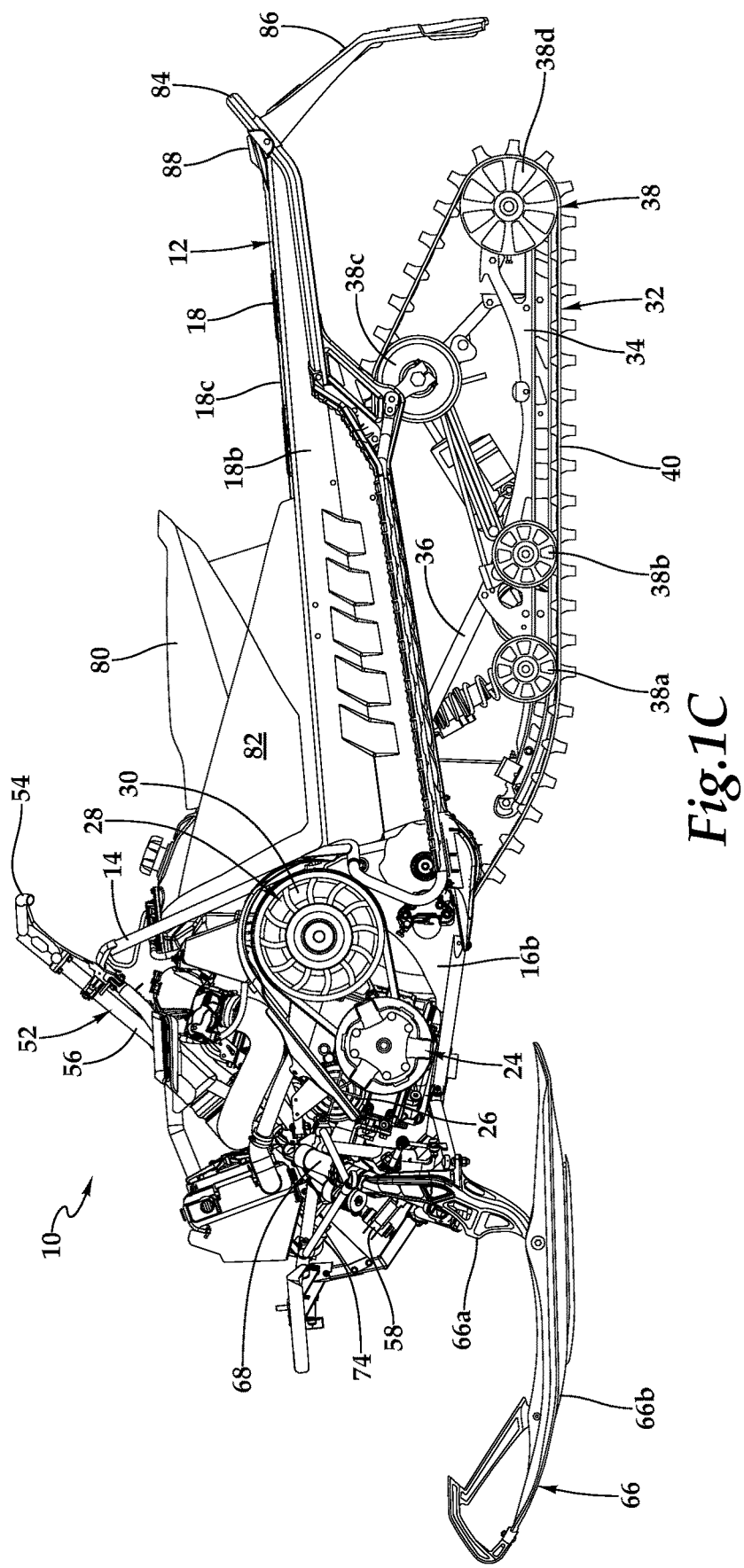

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

As used herein, the term "coupled" may include direct or indirect coupling by any means, including by mere contact or by moving and/or non-moving mechanical connections.

Referring to FIGS. 1A-1E in the drawings, a land vehicle depicted as a snowmobile is schematically illustrated and generally designated 10. Structural support for snowmobile 10 is provided by a chassis 12 that includes a forward frame assembly 14, a right side plate member 16*a*, a left side plate member 16*b* and a longitudinally extending drive tunnel 18. Forward frame assembly 14 (see also FIGS. 2 and 3A-3D) is formed from interconnected tubular members such as round and hollow tubular members comprised of metal, metal alloy, polymeric materials, fiber reinforced polymer composites and/or combinations thereof that are coupled together by welds, bolts, pins or other suitable fastening means. In the illustrated embodiment, forward frame assembly 14 includes a right-forward spar 14*a*, a left-forward spar 14*b*, a right-aft spar 14*c*, a left-aft spar 14*d*, right truss 14*e*, a left truss 14*f*, a right-upper beam 14*g*, a left-upper beam 14*h*, a right-lower beam 14*i*, a left-lower beam 14*j*, an upper cross member 14*k*, a lower cross member 14*l* and a nose frame assembly 14*m* including a nose rail 14*n* and a nose truss 14*o*. Plate members 16*a*, 16*b* are coupled to and preferably welded to forward frame assembly 14 such that forward frame assembly 14 and plate members 16*a*, 16*b* form a welded frame assembly. Drive tunnel 18 is coupled to forward frame assembly 14 and/or plate members 16*a*, 16*b* with welds, bolts, rivets or other suitable means. In the illustrated embodiment, drive tunnel 18 includes a right side panel 18*a*, a left side panel 18*b* and a top panel 18*c*. Drive tunnel 18 may be integrally formed or may consist of multiple members that are coupled together with welds, bolts, rivets or other suitable means. Plate members 16*a*, 16*b* and drive tunnel 18 may be formed from sheet metal, metal alloy, fiber reinforced polymer or other suitable material or combination of materials.

Various components of snowmobile 10 are assembled on or around forward frame assembly 14. One or more body panels 20 cover and protect the various components of snowmobile 10 including parts of forward frame assembly 14. For example, a hood panel 20*a*, a nose panel 20*b*, an upper right side panel 20*c* and a lower right side panel 20*d* shield underlying componentry from the snow and terrain. Similarly, an upper left side panel and a lower left side panel (not visible) also shield underlying componentry from the snow and terrain. In the illustrated embodiment, snowmobile 10 has a windshield 22 that shields the rider of snowmobile 10 from snow, terrain and frigid air during operation. Even through snowmobile 10 has been described and depicted as including specific body panels 20, it should be understood by those having ordinary skill in the art that a snowmobile of the present disclosure may include any number of body panels in any configuration to provide the shielding functionality. In addition, it should be understood by those having ordinary skill in the art that the right side and the left side of snowmobile 10 will be with reference to a rider of snowmobile 10 with the right side of snowmobile 10 corresponding to the right side of the rider and the left side of snowmobile 10 corresponding to the left side of the rider.

Body panels 20 have been removed from snowmobile 10 in FIGS. 1B-1E to reveal the underlying components of snowmobile 10. For example, snowmobile 10 has a powertrain 24 that includes an engine 26 and a drivetrain 28 both of which are coupled to forward frame assembly 14. Engine 26 resides in an engine bay 26*a* formed within forward frame assembly 14. In the illustrated embodiment, engine 26 is a four-stoke, three cylinder engine that is aftwardly tilted and has air intake inlets on the aftward side of engine 26 and exhaust outlets on the forward side of engine 26. In other embodiments, an engine of the present disclosure may be a two-stroke engine, an electric motor, a hybrid engine or other prime mover. In addition, an engine of the present disclosure may have more than or less than three cylinders, may be vertically mounted or mounted with a forward tilt and/or may have air intake inlets or exhaust outlets in other locations. In the illustrated embodiment, engine 26 is an internal combustion engine such as a naturally aspirated internal combustion engine, a supercharged internal combustion engine or a turbo charged internal combustion engine. Drivetrain 28 includes a transmission 30 such as a continuously variable transmission, an electrically variable transmission or other suitable transmission type for varying the ratio of the engine output speed to the drive track input speed.

A drive track system 32 is at least partially disposed within and/or below drive tunnel 18 and is in contact with the ground to provide ground propulsion for snowmobile 10. Torque and rotational energy are provided to drive track system 32 from engine 26 via drivetrain 28. Drive track system 32 includes a track frame 34, an internal suspension 36, a plurality of idler wheels 38 such as idler wheels 38a, 38b, 38c, 38d and an endless track 40. Track frame 34 may be coupled to forward frame assembly 14 via a swing arm having a coil spring, a rigid strut, a torsion spring, an elastomeric member or any other suitable coupling configuration. Endless track 40 is driven by a track drive sprocket via a track driveshaft (not visible) that is rotated responsive to torque provided from powertrain 24. Endless track 40 rotates around track frame 34 and idler wheels 38 to propel snowmobile 10 in either the forward direction, as indicated by arrow 46a, or the backwards direction, as indicated by arrow 46b in FIG. 1B. When viewed from the right side of snowmobile 10, endless track 40 rotates around track frame 34 and idler wheels 38 in the clockwise direction, as indicated by arrow 48a, to propel snowmobile 10 in the forward direction 46a. Endless track 40 rotates around track frame 34 and idler wheels 38 in the counterclockwise direction, as indicated by arrow 48b, to propel snowmobile 10 in the backward direction 46b. The forward and backward directions also represent the longitudinal direction of snowmobile 10 with the lateral direction of snowmobile 10 being normal thereto and represented by the rightward direction, as indicated by arrow 50a, and the leftward direction, as indicated by arrow 50b in FIG. 1E. The backward direction may also be referred to herein as the aftward direction.

Figure 1D:
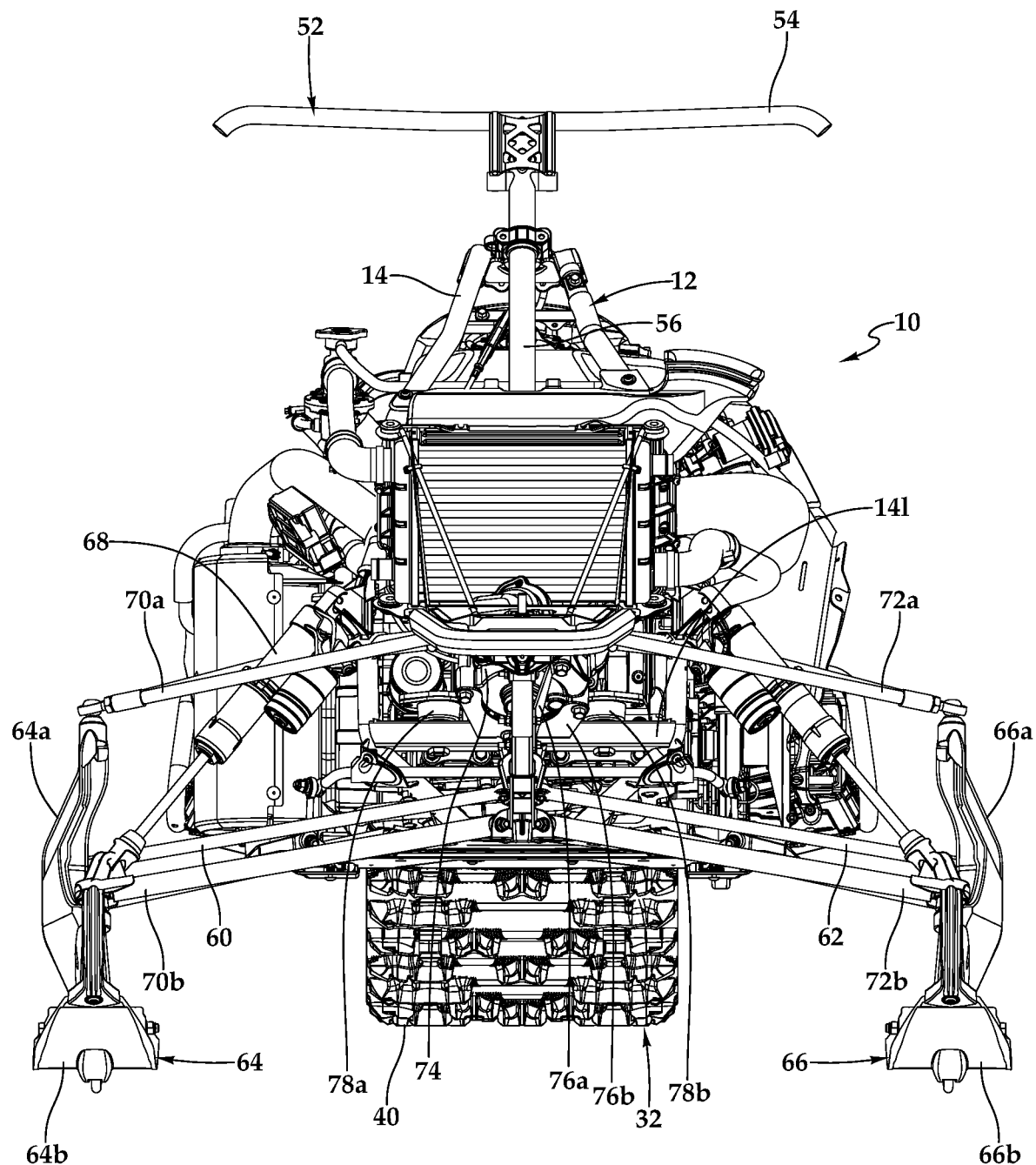
Figure 1E:
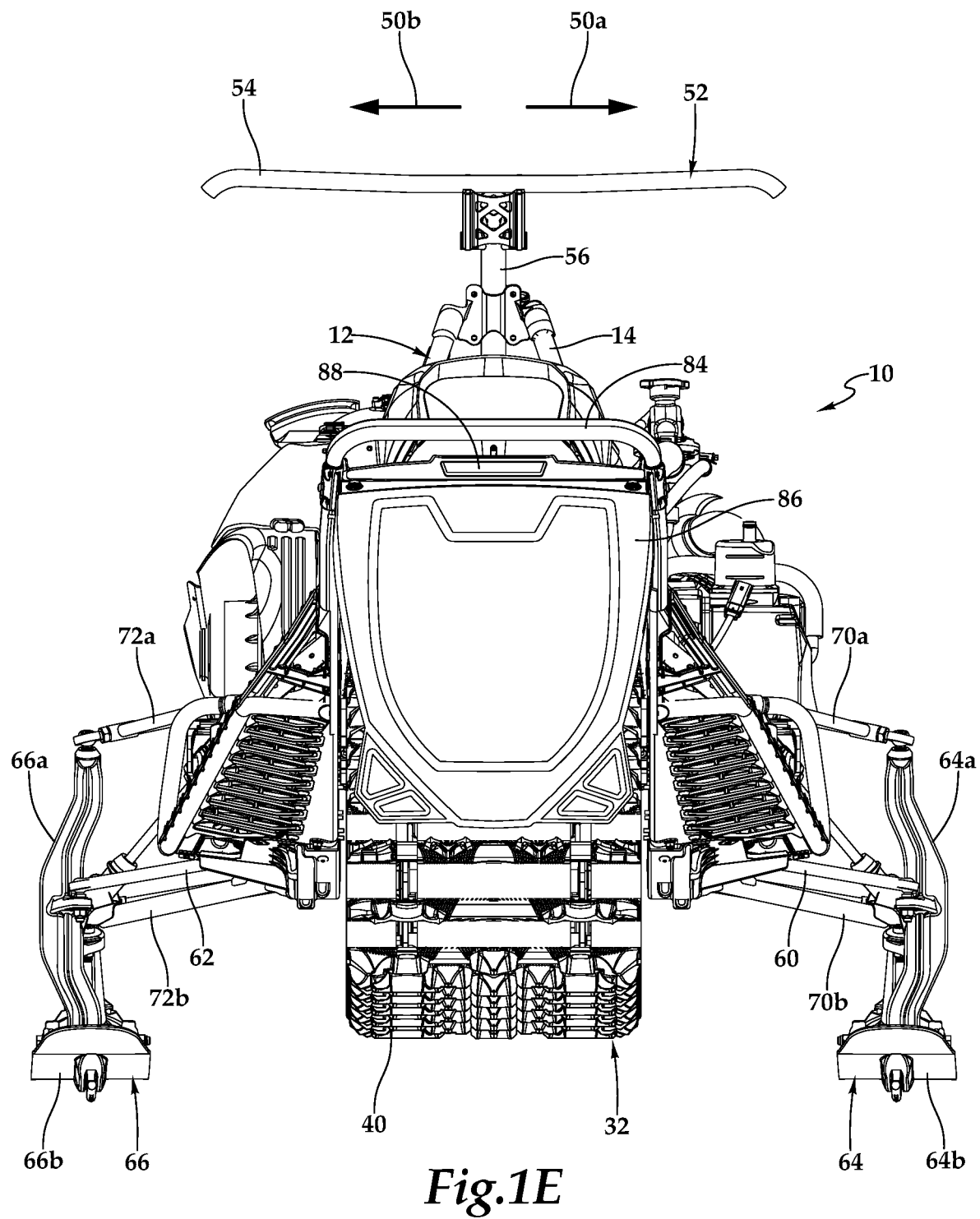
Figure 2:
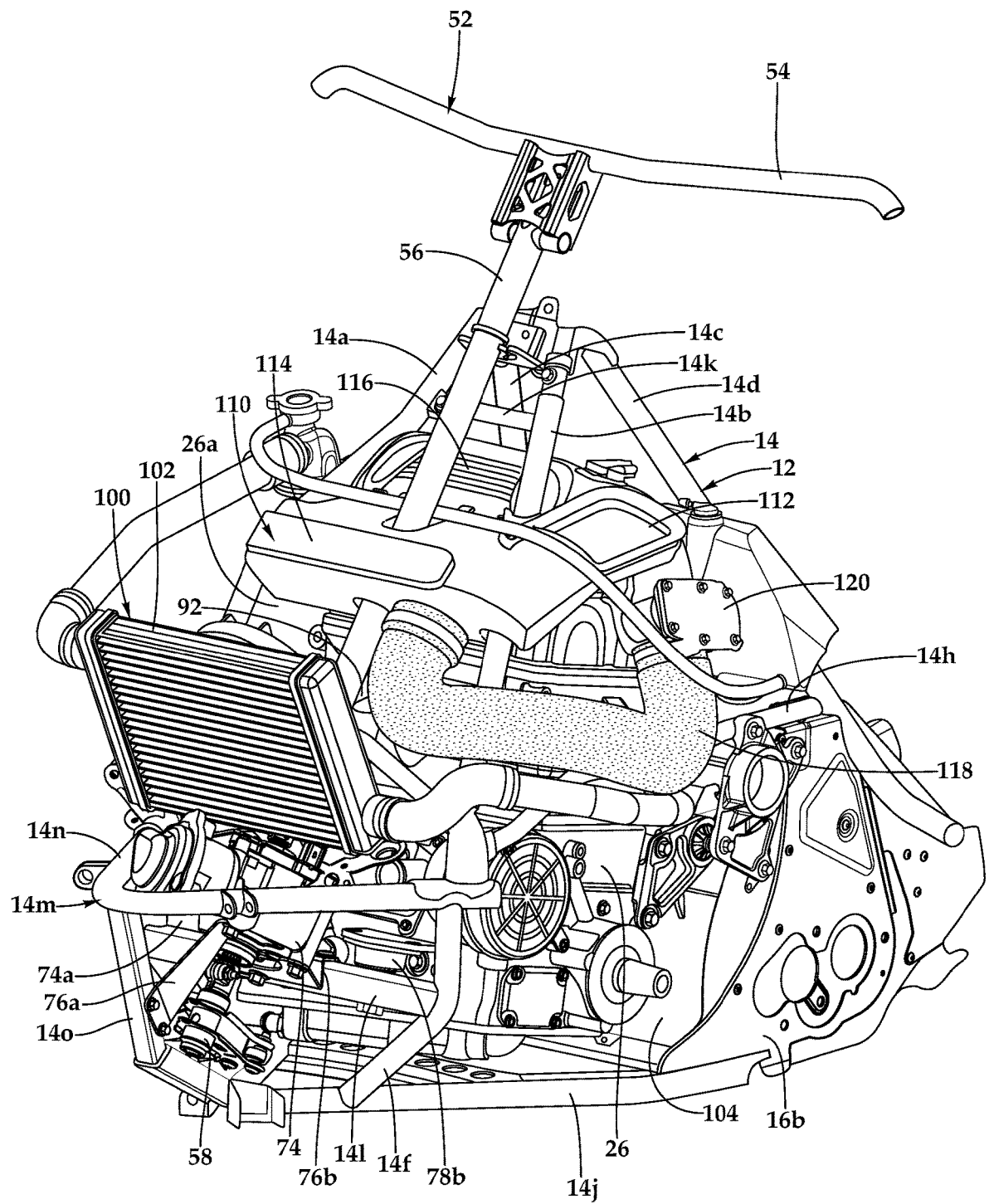
FIG. 2 is an isometric view of a forward portion of a snowmobile having a steering system including an electronic steering assist unit positioned along the centerline of the snowmobile in accordance with embodiments of the present disclosure.

Snowmobile 10 has a steering system 52 that includes a handlebar assembly 54, a steering column 56, a steering arm assembly 58, a right tie rod 60, a left tie rod 62, a right ski assembly 64 including a right spindle 64a and a right ski 64b, and left ski assembly 66 including a left spindle 66a and a left ski 66b. Snowmobile 10 has a front suspension assembly 68 that is coupled between forward frame assembly 14 and ski assemblies 64, 66 to provide front end support for snowmobile 10. In addition, right ski assembly 64 is coupled to forward frame assembly 14 by upper and lower A-arms 70a, 70b, and left ski assembly 66 is coupled to forward frame assembly 14 by upper and lower A-arms 72a, 72b. Steering system 52 enables the rider to steer snowmobile 10 by rotating handlebar assembly 54 which causes ski assemblies 64, 66 to pivot. In the illustrated embodiment, the pivoting of ski assemblies 64, 66 responsive to rotation of handlebar assembly 54 is assisted by an electric power steering system (EPS) depicted as electric steering assist unit 74. As best seen in FIG. 2, electric steering assist unit 74 is positioned within an electric steering assist unit bay 74a defined by nose assembly 14m. Electric steering assist unit 74 is coupled to forward frame assembly 14 via a nose bracket 76a that is coupled between electric steering assist unit 74 and nose truss 14o and an aft bracket 76b that is coupled between electric steering assist unit 74 and lower cross member 14l. As best seen in FIGS. 1D and 2, lower cross member 14l is positioned between electric steering assist unit 74 and engine 26. In this position, lower cross member 14l resiliently supports engine 26 via right-front engine mount 78a and left-front engine mount 78b. Aft bracket 76b for electric steering assist unit 74 is coupled to lower cross member 14l between right-front engine mount 78a and left-front engine mount 78b.

The rider controls snowmobile 10 from a seat 80 that is position atop a fuel tank 82, above drive tunnel 18, aft of handlebar assembly 54 and aft of forward frame assembly 14. Snowmobile 10 has a lift bumper 84 that is coupled to an aft end of drive tunnel 18 that enables a person to lift the rear end of snowmobile 10 in the event snowmobile 10 becomes stuck or needs to be repositioned when it is not moving. Snowmobile 10 has a snow flap 86 that deflects snow emitted by endless track 40. In the illustrated embodiment, snow flap 86 is coupled to lift bumper 84. In other embodiments, a snow flap may be coupled directly to drive tunnel 18. A taillight housing 88 is also coupled to lift bumper 84 and houses a taillight of snowmobile 10. Snowmobile 10 has an exhaust system 90 that includes an exhaust manifold 92 that is coupled to one or more exhaust outlets on the forward side of engine 26, an exhaust duct 94 and a muffler 96. Exhaust system 90 is configured to direct high-temperature exhaust gases away from engine 26 and the rider of snowmobile 10. As exhaust system 90 including exhaust manifold 92 is coupled to the forward side of engine 26, the forward side of engine 26 may be referred to herein as the hot side of engine 26 due to the hot temperatures associated with engine exhaust. The aftward side of engine 26 is concomitantly considered the cool side of engine 26 as hot exhaust system components are located opposite and/or remote therefrom.

It should be appreciated that snowmobile 10 is merely illustrative of a variety of vehicles that can implement the embodiments disclosed herein. Other vehicle implementations can include motorcycles, snow bikes, all-terrain vehicles (ATVs), utility vehicles, recreational vehicles, scooters, automobiles, mopeds, straddle-type vehicles and the like. As such, those skilled in the art will recognize that the embodiments disclosed herein can be integrated into a variety of vehicle configurations. It should be appreciated that even though ground-based vehicles are particularly well-suited to implement the embodiments of the present disclosure, airborne vehicles and devices such as aircraft can also implement the embodiments.

Referring additionally to FIG. 2 of the drawings, further details of snowmobile 10 will now be discussed. In the illustrated embodiments, engine 26 is an aftwardly tilted engine such that an upper portion of engine 26 is aft of a lower portion of engine 26. For example, engine 26 is aftwardly tilted between five degrees and twenty degrees from vertical such as about ten degrees from vertical. It should be understood by those having ordinary skill in the art that engine 26 could have other aftwardly tilted angles both less than five degrees or greater than twenty degrees from vertical. Snowmobile 10 has an engine cooling system 100 that includes a radiator 102 and an arcuate heat exchanger 104. Radiator 102 is coupled to forward frame assembly 14 and more specifically, radiator 102 is coupled to and positioned above nose assembly 14m of forward frame assembly 14. In this location, radiator 102 is positioned forward of engine 26 and is tilted forward such that an upper portion of radiator 102 is forward of a lower portion of radiator 102. Radiator 102 is configured to remove heat from a fluid circulating therethrough responsive to air passing through radiator 102 from the front side of radiator 102 to the rear side of radiator 102. Arcuate heat exchanger 104 is coupled to a forward portion of drive tunnel 18 and to forward frame assembly 14. In this location, arcuate heat exchanger 104 is positioned aft of engine 26 and below fuel tank 82. Arcuate heat exchanger 104 is configured to remove heat from a fluid circulating therethrough responsive to snow in drive tunnel 18. For example, during operation of snowmobile 10, endless track 40 kicks snow toward an inner surface of arcuate heat exchanger 104 which is configured to retain at least a portion of this snow. Heat from the fluid circulating through arcuate heat exchanger 104 is transferred to the retained snow causing the retained snow to melt. As discussed herein, electric steering assist unit 74 is positioned within electric steering assist unit bay 74a defined by nose assembly 14m with nose bracket 76a coupled between electric steering assist unit 74 and nose truss 14o and aft bracket 76b coupled between electric steering assist unit 74 and lower cross member 14l. In this position, electric steering assist unit 74 is positioned forward of engine 26 and below radiator 102 with at least a portion of electric steering assist unit 74 forward of radiator 102.

In the illustrated embodiment, engine 26 has an air intake system 110 that receives air from the atmosphere and distributes the air to each of the cylinders of engine 26. More specifically, air intake system 110 includes an air inlet 112 that feeds air into an airbox 114 that is positioned generally forward and generally above engine 26. Air from airbox 114 is routed to an air intake plenum 116 positioned above engine 26 via an air duct 118. The volume of air delivered to air intake plenum 116 from airbox 114 is controlled via a throttle body valve assembly 120. Air intake plenum 116 is configured to dampen the air flow prior to distribution of the air to the cylinders of engine 26 via air intake runners that extend downwardly and aftwardly from air intake plenum 116 and couple to one or more air inlets positioned on the aftward side of engine 26.

Figure 3A:
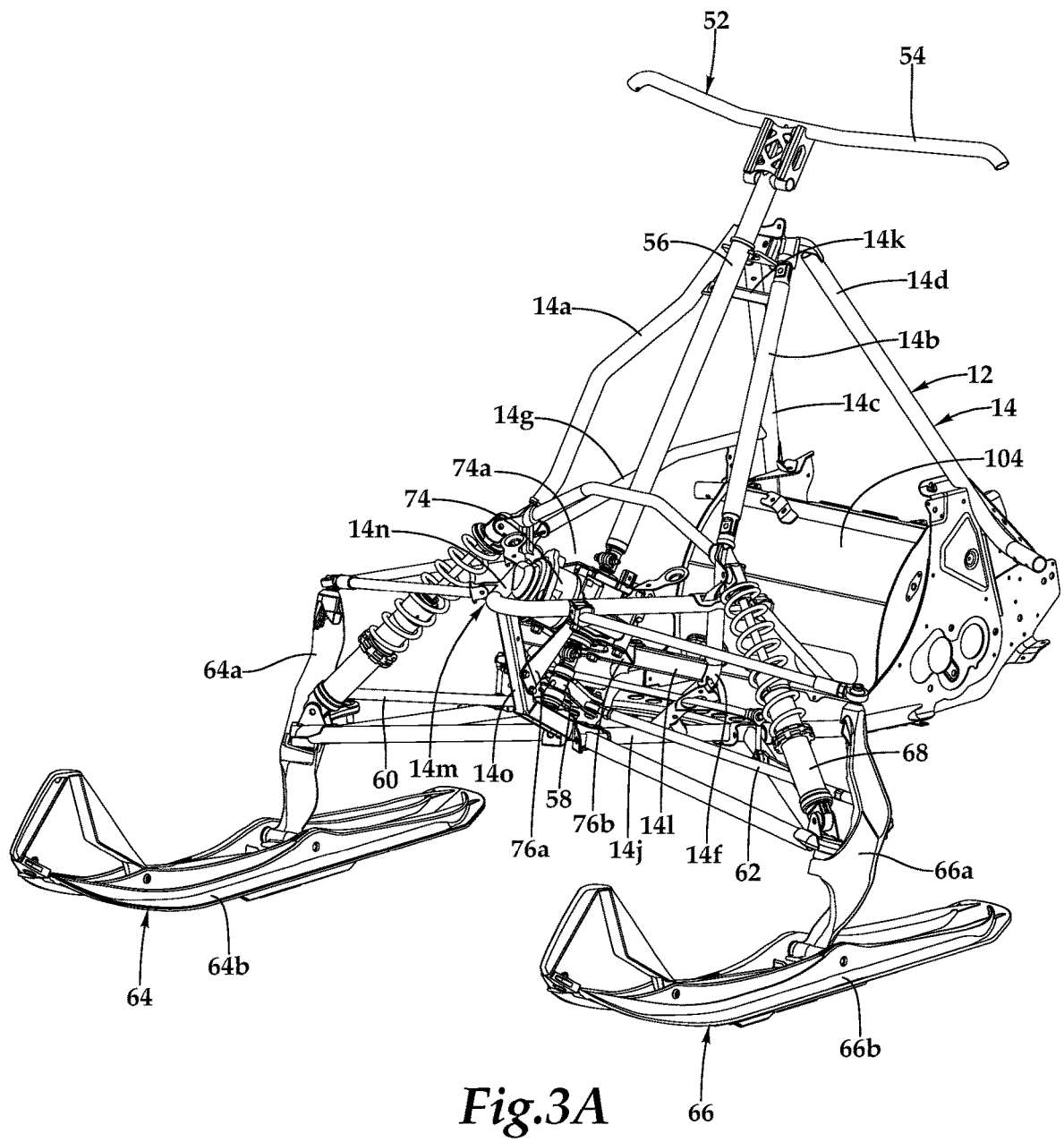
FIGS. 3A-3E are schematic illustrations of a steering system for a snowmobile including an electronic steering assist unit in accordance with embodiments of the present disclosure.
Figure 3B:
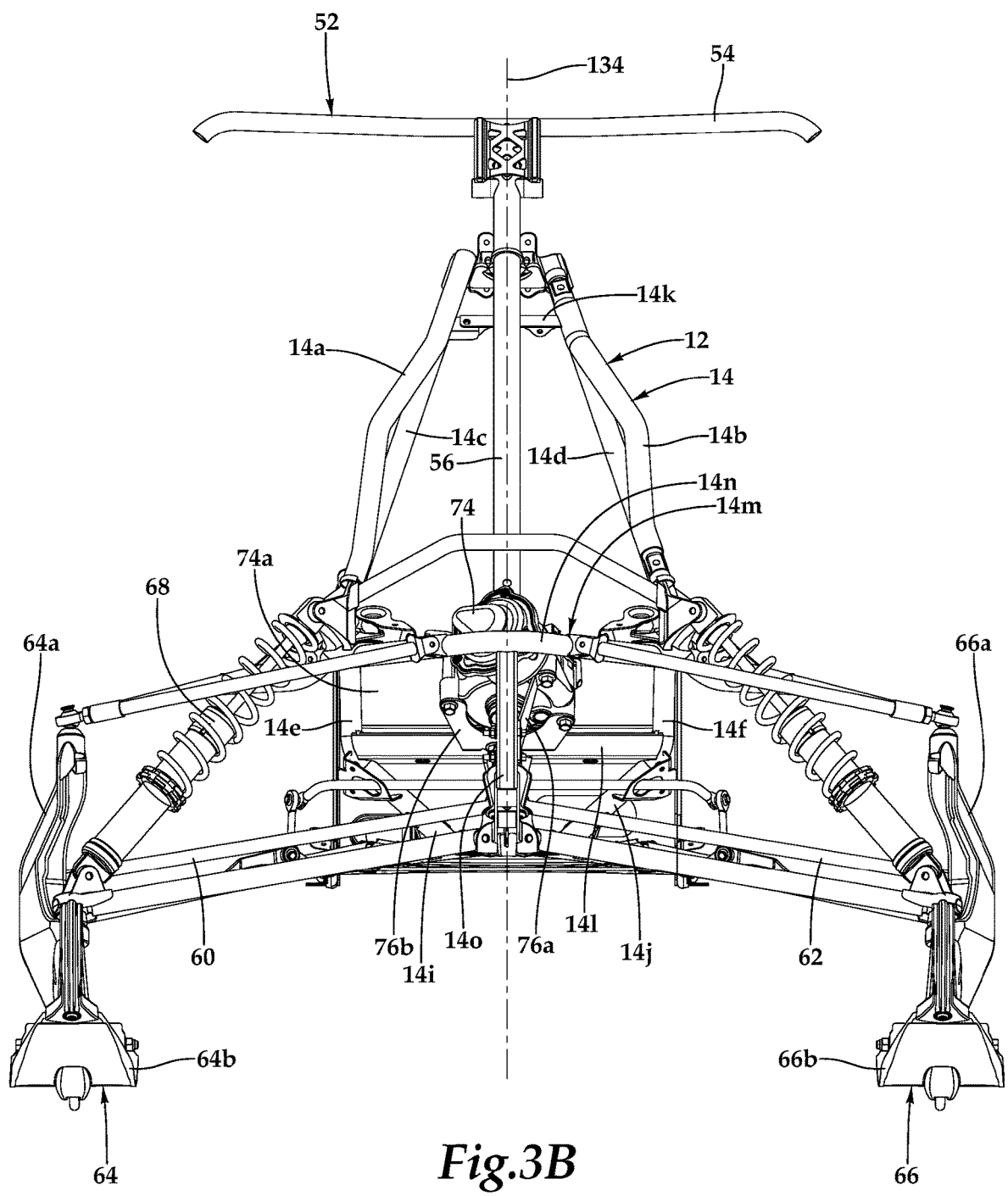
Figure 3C:
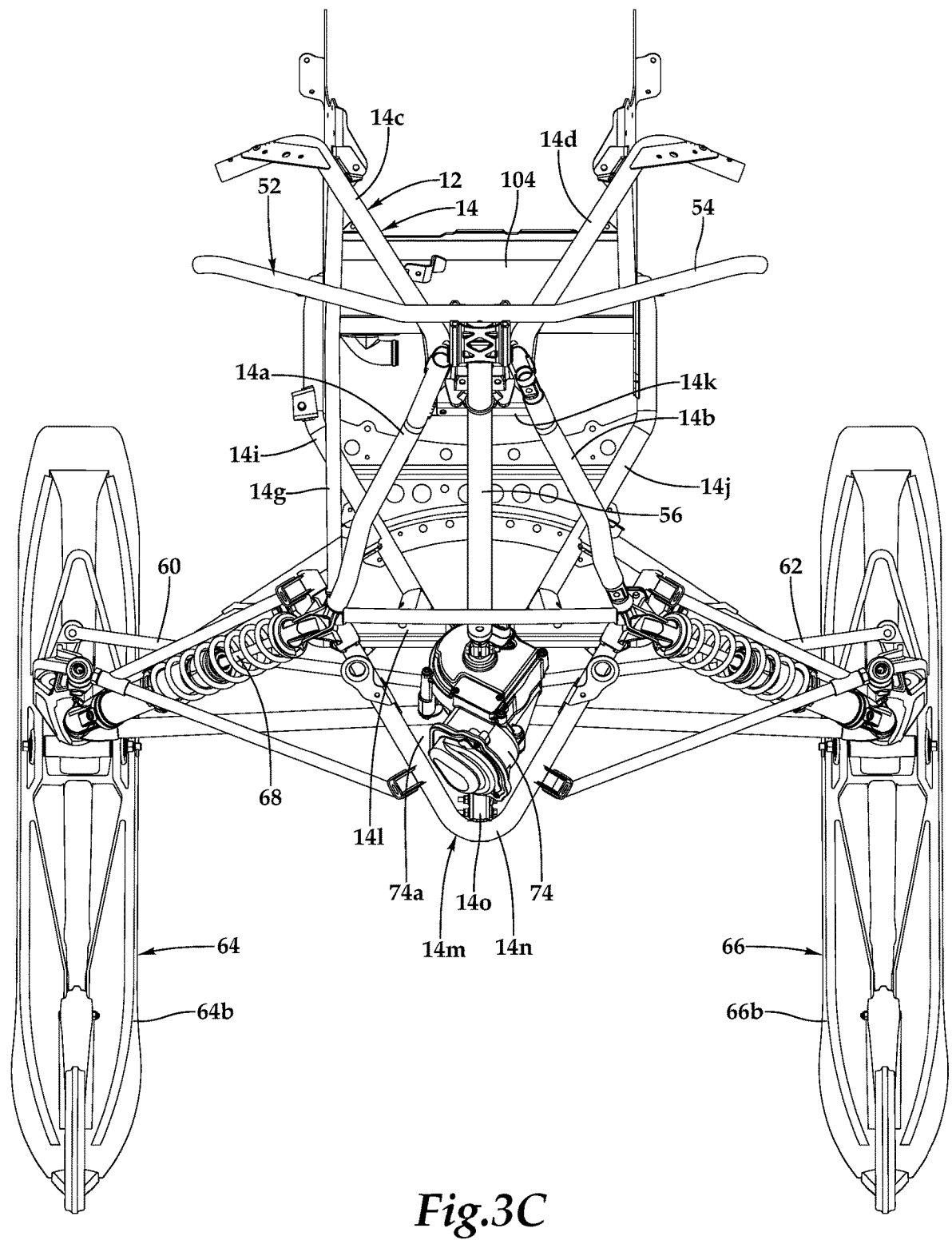
Figure 3D:
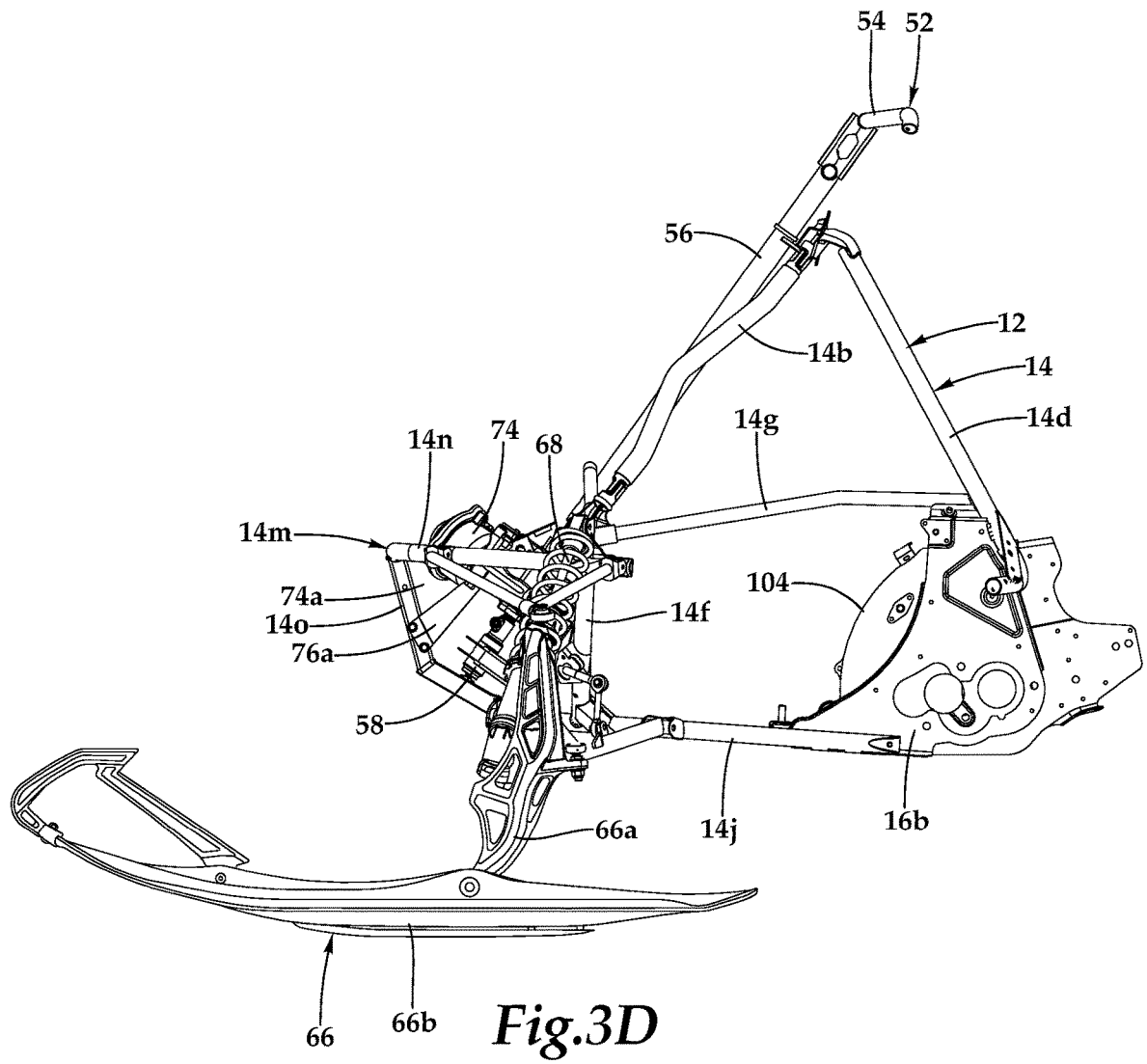
Figure 3E:
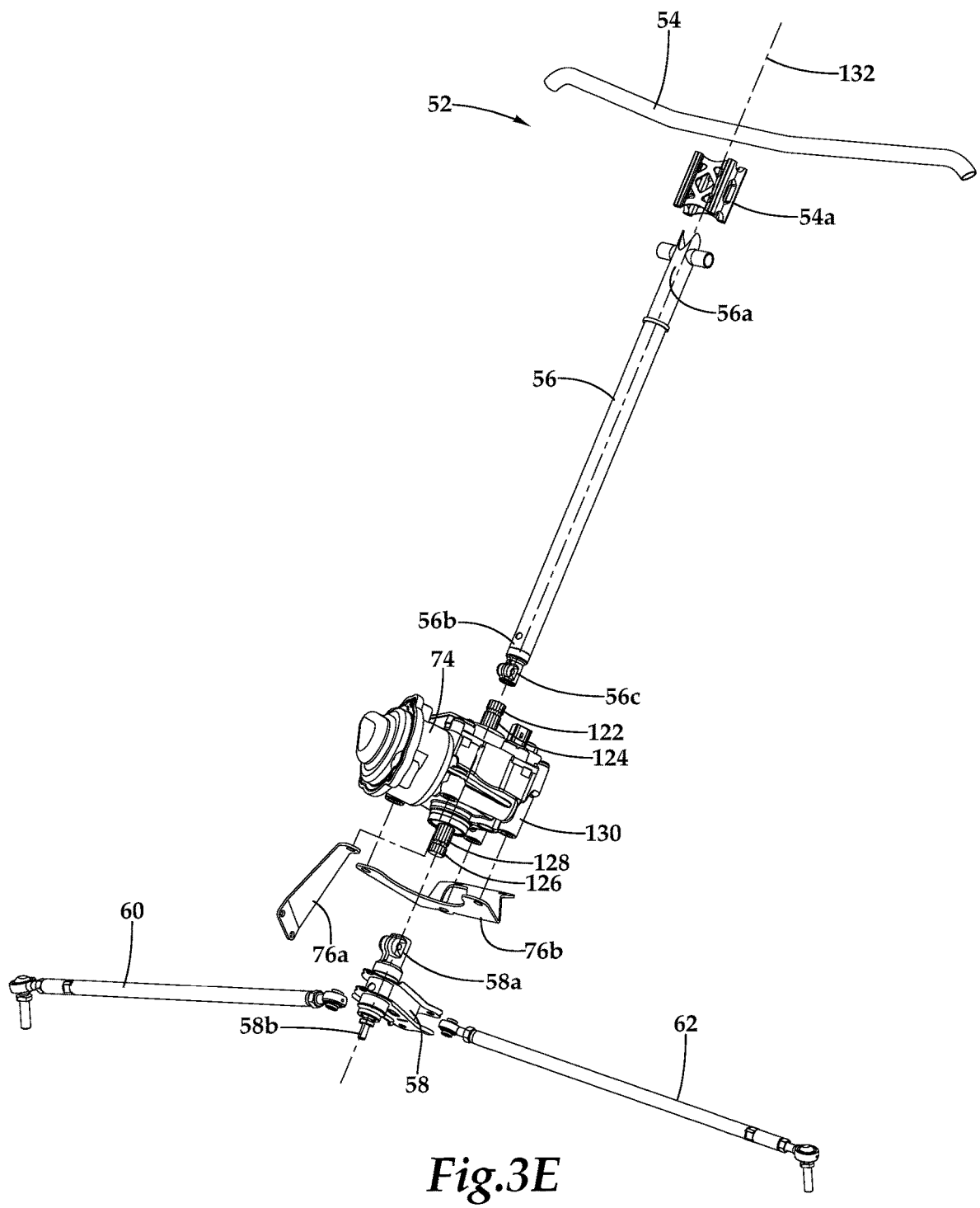

Referring additionally to FIGS. 3A-3E of the drawings, further details relating to steering system 52 of snowmobile 10 will now be disclosed. As discussed herein, steering system 52 includes handlebar assembly 54, steering column 56, steering arm assembly 58, right tie rod 60, left tie rod 62, right ski assembly 64 including right spindle 64a and right ski 64b, and left ski assembly 66 including left spindle 66a and left ski 66b. In addition, steering system 52 includes electric steering assist unit 74. Steering column 56 is a straight steering column formed as a non-segmented single post that is positioned forward of upper cross member 14k. As best seen in FIG. 3E, steering column 56 has an upper end 56a and lower end 56b. Upper end 56a of steering column 56 is coupled to handlebar assembly 54 via a handlebar bracket 54a. Lower end 56b of steering column 56 includes a splined coupler 56c that may be integral with or coupled to lower end 56b of steering column 56. Splined coupler 56c receives an input shaft 122 having input splines 124 therein to couple lower end 56b of steering column 56 to electric steering assist unit 74. Steering arm assembly 58 includes a splined coupler 58a that receives an output shaft 126 having output splines 128 therein such that electric steering assist unit 74 is coupled directly to steering arm assembly 58 without a steering column post or other extension positioned therebetween. Steering arm assembly 58 is coupled to the proximal ends tie rods 60, 62. The distal ends of tie rods 60, 62 are respectively coupled to ski assemblies 64, 66 such that rotation of handlebar assembly 54 by the rider of snowmobile 10, together with the assist of electric steering assist unit 74, causes ski assemblies 64, 66 to pivot, thus turning snowmobile 10. A lower end 58b of steering arm assembly 58 is received within a bearing assembly (not visible) of nose truss 14o such that steering arm assembly 58 is operable to rotate relative thereto.

Electric steering assist unit 74 includes an outer housing 130 that contains the working components thereof including, for example, an electric motor, a torque sensor, a controller and a torsion bar that couples input shaft 122 to output shaft 126. Outer housing 130 is fixed against rotation relative to forward frame assembly 14 by brackets 76a, 76b. In operation, the input torque applied from handlebar assembly 54 via steering column 56 on input shaft 122 is measured by the torque sensor. Input torque data is then provided to the controller from the torque sensor. Based upon the input torque data and additional factors such as the speed of snowmobile 10, the controller commands the electric motor to provide an output assist torque to output shaft 126 that is additive to the input torque applied to output shaft 126 from input shaft 122 via the torsion bar. The use of electric steering assist unit 74 improves the handling of snowmobile 10, reduces fatigue associated with driving snowmobile 10 and can allow snowmobile 10 to be driven more aggressively. In addition, coupling electric steering assist unit 74 directly to steering arm assembly 58 has numerous advantages over prior snowmobile steering systems that have electric steering assist units including lowering the center of gravity of snowmobile 10 by positioning the electric steering assist unit at a lowermost location of the steering column. In addition, coupling electric steering assist unit 74 directly to steering arm assembly 58, together with using a straight steering column 56 and having a common axis of rotation 132 shared by handlebar assembly 54, steering column 56, electric steering assist unit 74 and steering arm assembly 58 that is positioned along a centerline 134 (see FIG. 3B) of snowmobile 10, reduces the number of parts required in steering system 52 and reduces the complexity of steering system 52, which improves the overall reliability of snowmobile 10.

Referring now to FIGS. 4A-4G of the drawings, an embodiment of a steering system for a snowmobile, such as snowmobile 10, will now be discussed. Steering system 200 includes a handlebar assembly 202, a steering column 204, a steering arm assembly 206, a right tie rod 208, a left tie rod 210, a right ski assembly 212 including a right spindle 212a and a right ski 212b, and a left ski assembly 218 including a left spindle 218a and a left ski 218b. In addition, steering system 200 includes an electric power steering system depicted as an electric steering assist unit 220. Steering system 200 is coupled to a forward frame assembly 214 that includes a right-forward spar 214a, a left-forward spar 214b, a right-aft spar 214c, a left-aft spar 214d, right truss 214e, a left truss 214f, a right-upper beam 214g, a left-upper beam (not installed in the illustrated embodiment), a right-lower beam 214i, a left-lower beam 214j, an upper cross member 214k and a nose frame assembly 214m including a nose rail 214n and a nose truss 214o. Plate members 216a, 216b are coupled to and preferably welded to forward frame assembly 214 such that forward frame assembly 214 and plate members 216a, 216b form a welded frame assembly. Right ski assembly 212 is coupled to forward frame assembly 214 by an upper A-arm 270 at forward and aftward mounting points 270a, 270b and by a lower A-arm 272 at forward and aftward mounting points 272a, 272b. Likewise, left ski assembly 218 is coupled to forward frame assembly 214 by an upper A-arm 274 at forward and aftward mounting points 274a, 274b and by a lower A-arm 276 at forward and aftward mounting points 276a, 276b.

Figure 4A:
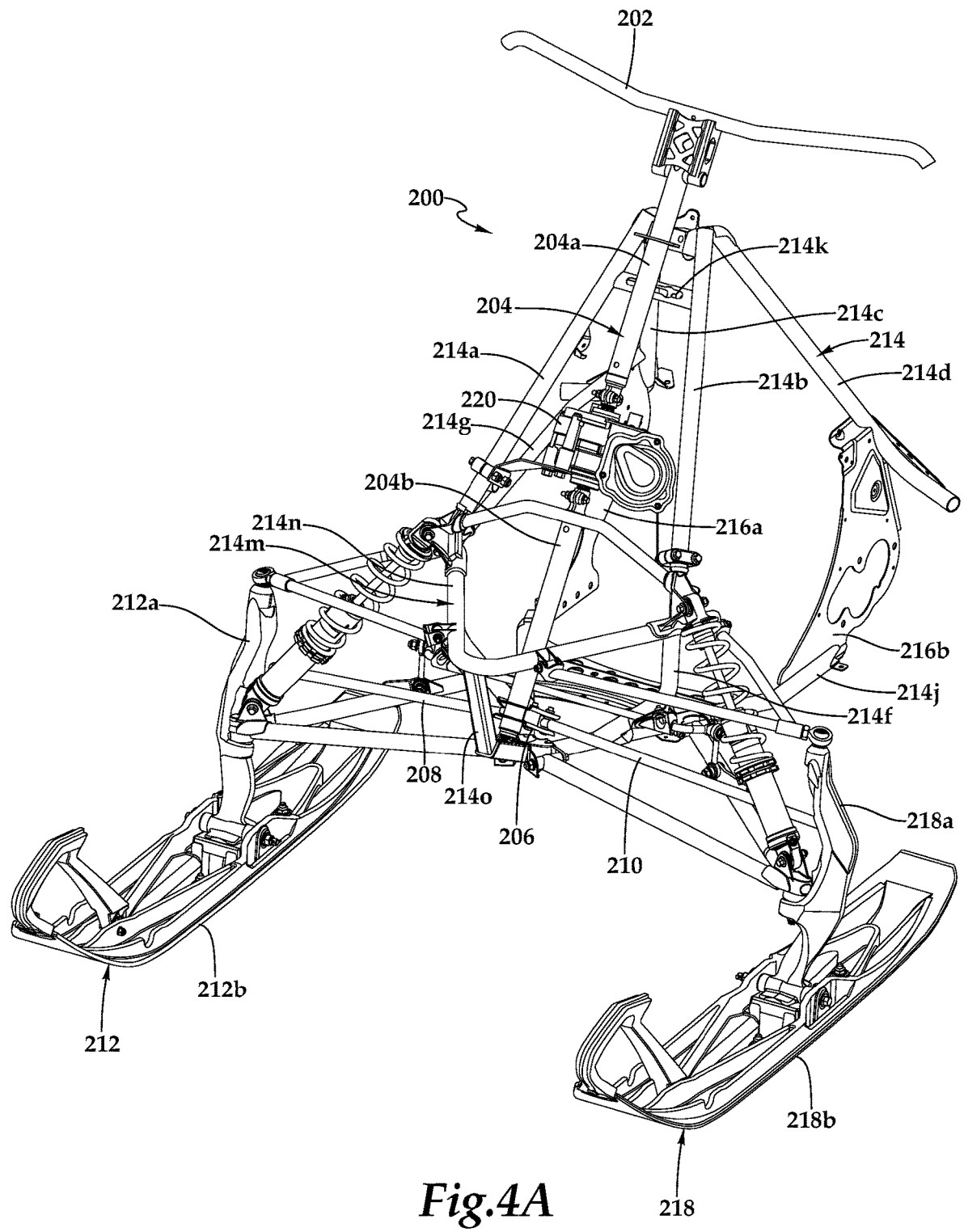
Figure 4B:
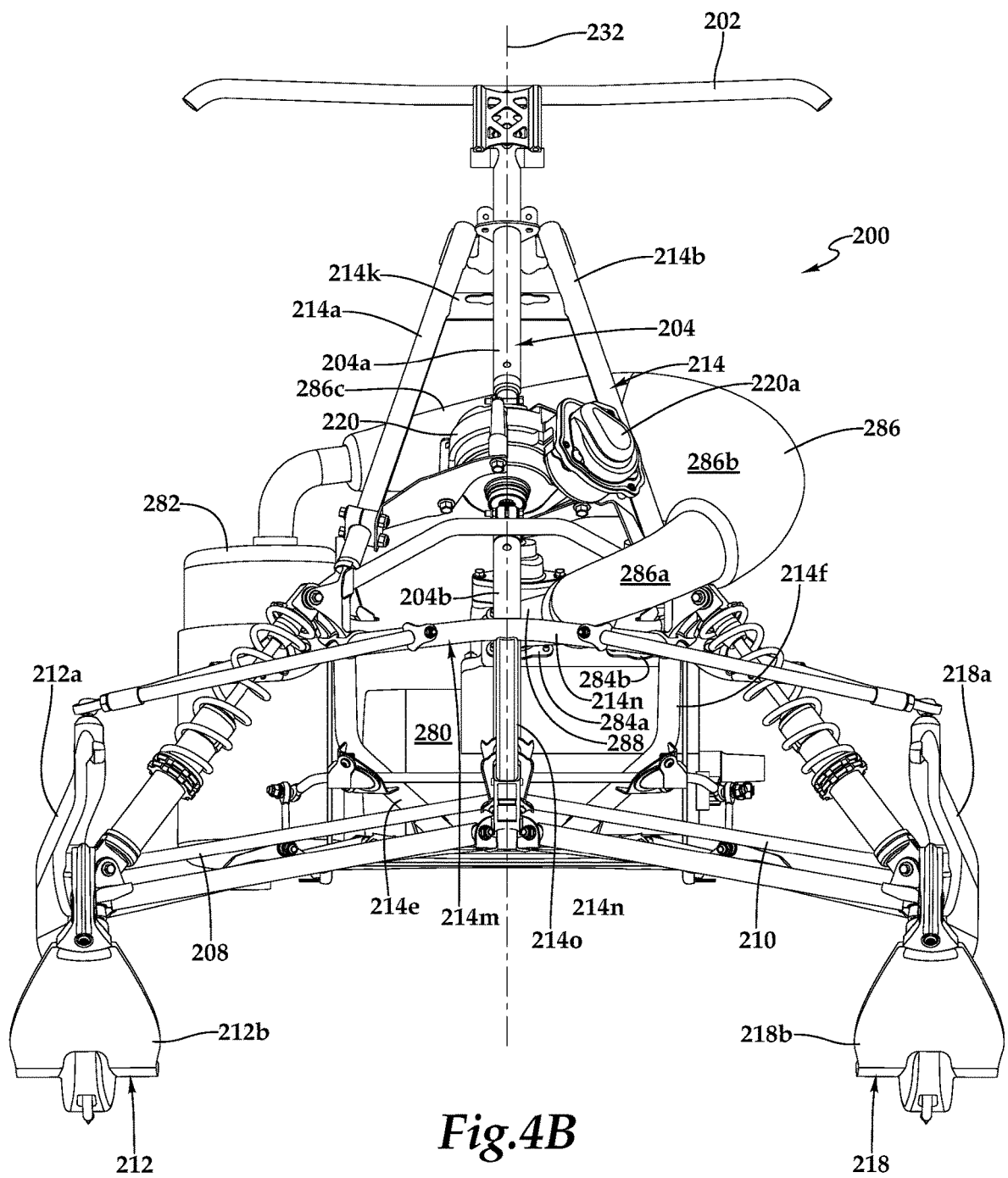
Figure 4C:
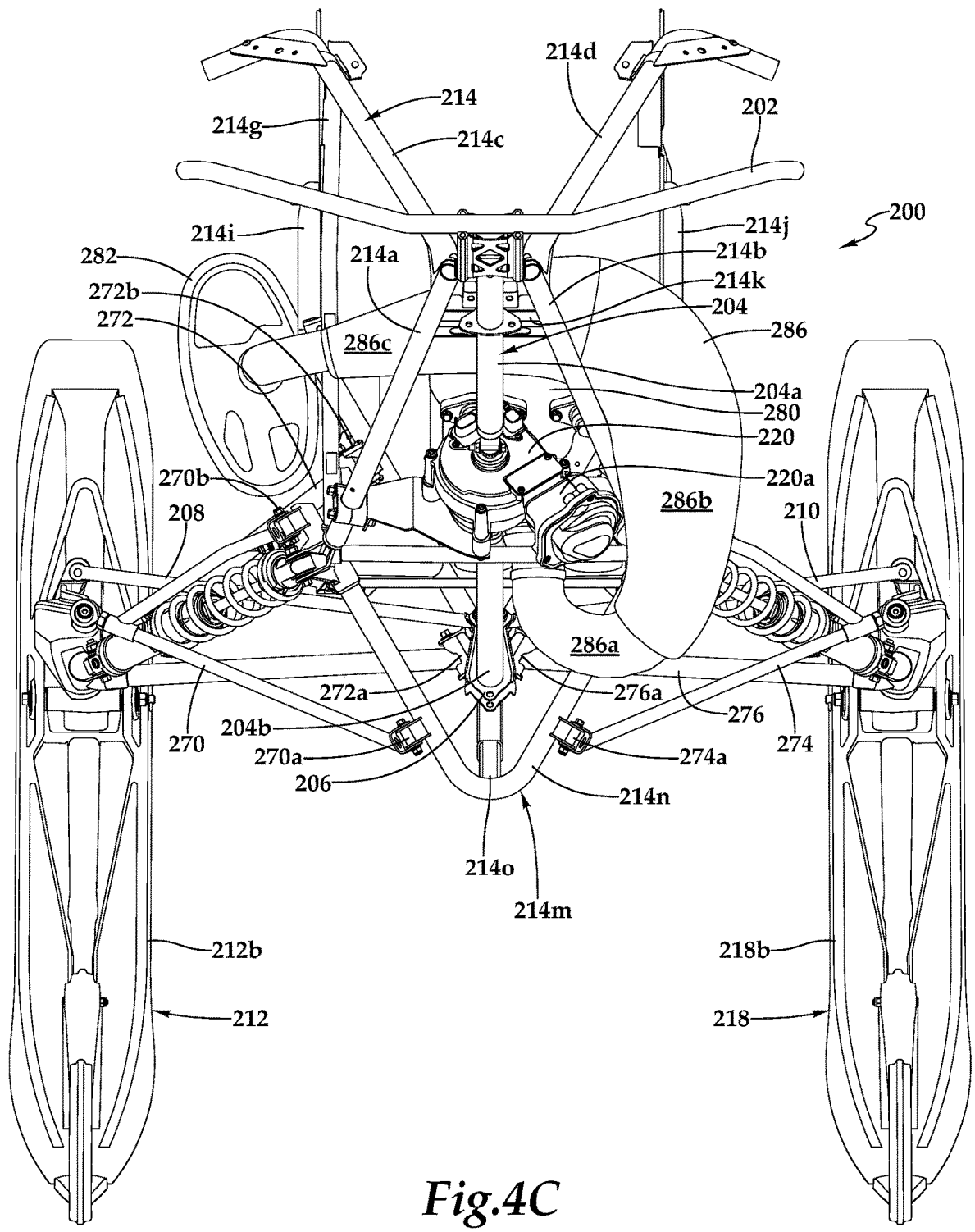
Figure 4D:
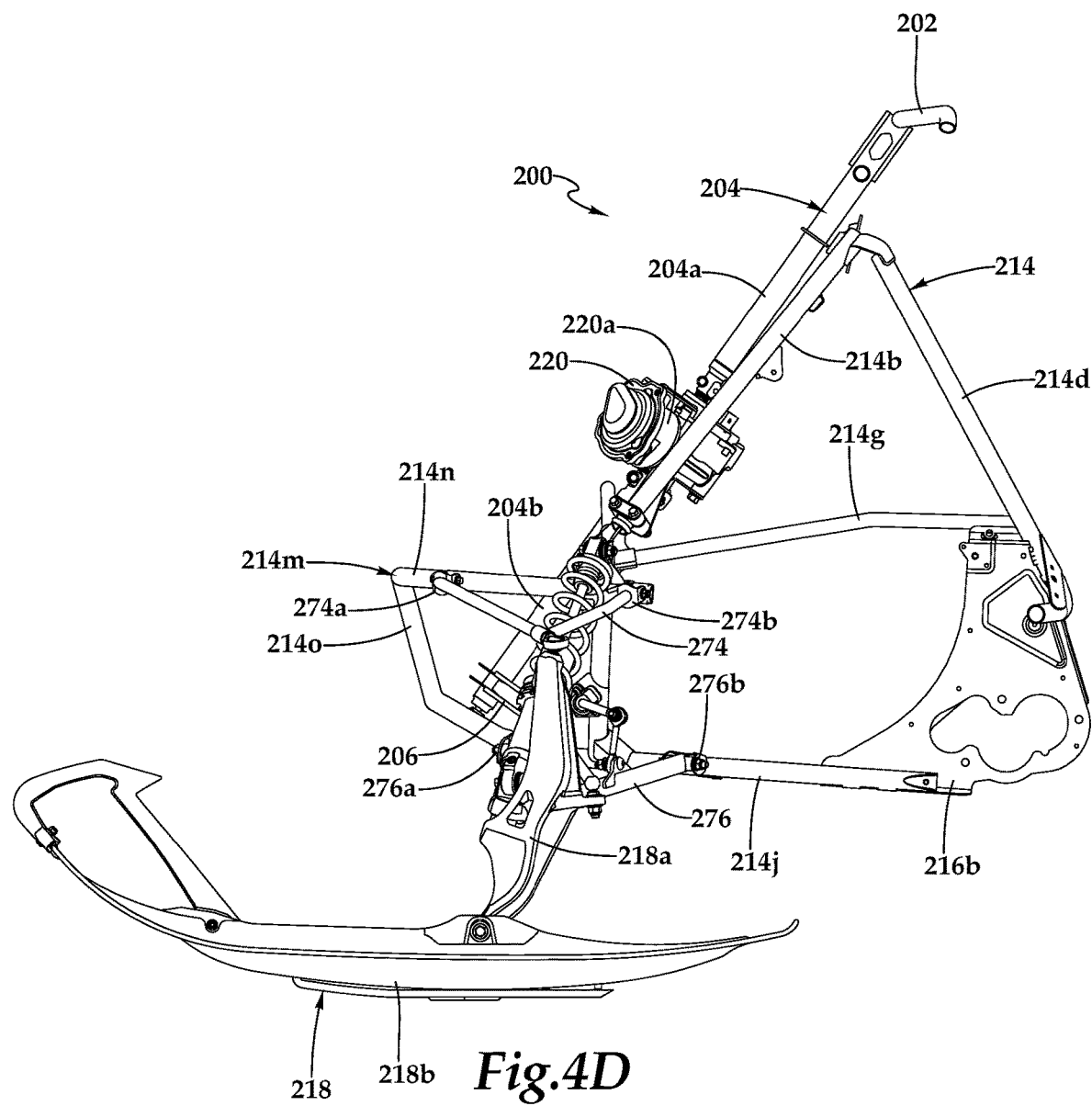
Figure 4E:
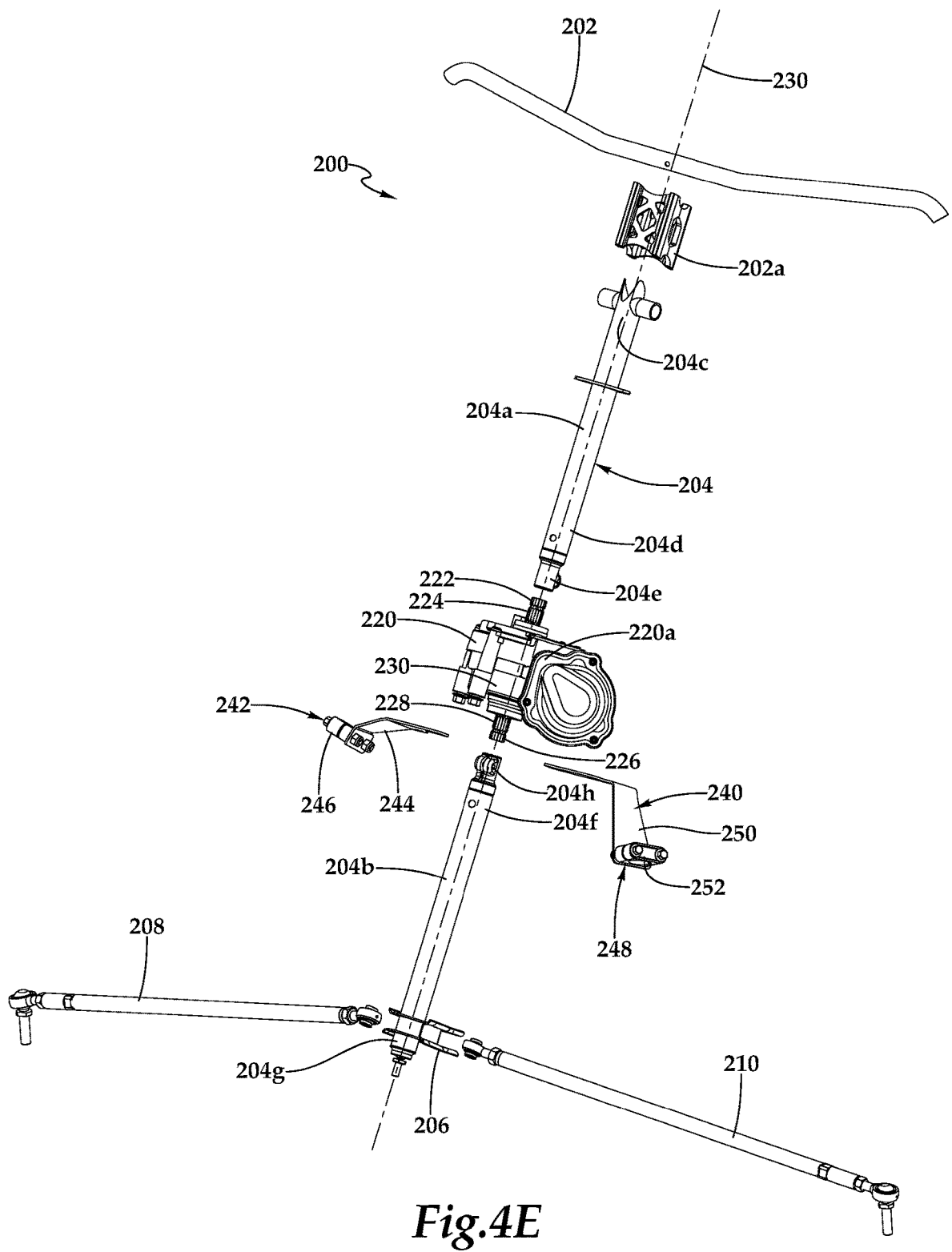

In the illustrated embodiments, steering column 204 is a straight steering column formed from an upper post 204a that is positioned forward of upper cross member 214k and a lower post 204b. As best seen in FIG. 4E, upper post 204a of steering column 204 has an upper end 204c and lower end 204d. Upper end 204c of upper post 204a is coupled to handlebar assembly 202 via a handlebar bracket 202a. Lower end 204d of upper post 204a includes a splined coupler 204e that may be integral with or coupled to lower end 204d of upper post 204a. Splined coupler 204e receives an input shaft 222 having input splines 224 therein to couple lower end 204d of upper post 204a to electric steering assist unit 220. Lower post 204b of steering column 204 has an upper end 204f and lower end 204g. Upper end 204f of lower post 204b includes a splined coupler 204h that may be integral with or coupled to upper end 204f of lower post 204b. Splined coupler 204h receives an output shaft 226 having output splines 228 therein to couple upper end 204f of lower post 204b to electric steering assist unit 220. Steering arm assembly 206 is coupled to lower end 204g of lower post 204b. Steering arm assembly 206 is coupled to the proximal ends tie rods 208, 210. The distal ends of tie rods 208, 210 are respectively coupled to ski assemblies 212, 218 such that rotation of handlebar assembly 202 by the rider of the snowmobile, together with the assist of electric steering assist unit 220, causes ski assemblies 212, 218 to pivot, thus turning the snowmobile. Lower end 204g of lower post 204b is received within a bearing assembly (not visible) of nose truss 214o such that lower post 204b is operable to rotate relative thereto.

Electric steering assist unit 220 includes an outer housing 230 that contains the working components thereof including, for example, an electric motor 220a, a torque sensor, a controller and a torsion bar that couples input shaft 222 to output shaft 226. In operation, the input torque applied from handlebar assembly 202 via upper post 204a on input shaft 222 is measured by the torque sensor. Input torque data is then provided to the controller from the torque sensor. Based upon the input torque data and additional factors such as the speed of the snowmobile, the controller commands electric motor 220a to provide an output assist torque to output shaft 226 that is additive to the input torque applied to output shaft 226 from input shaft 222 via the torsion bar. The use of electric steering assist unit 220 improves the handling of the snowmobile, reduces fatigue associated with driving the snowmobile and can allow the snowmobile to be driven more aggressively. In addition, using steering system 200 that has a common axis of rotation 230 shared by handlebar assembly 202, steering column 204, electric steering assist unit 220 and steering arm assembly 206 that is positioned along a centerline 232 (see FIG. 4B) of the snowmobile, reduces the number of parts required in steering system 200 and reduces the complexity of steering system 200, which improves the overall reliability of the snowmobile.

To prevent a torque pre-load on electric steering assist unit 220, the present embodiment utilizes a floating mounting system 240 to couple electric steering assist unit 220 to forward spars 214a, 214b. For example, a torque pre-load on electric steering assist unit 220 could cause the torque sensor to sense the presence of an input torque even when no input torque is being applied from handlebar assembly 202 via upper post 204a on input shaft 222. Likewise, a torque pre-load on electric steering assist unit 220 could cause the torque sensor to sense an inaccurate input torque applied from handlebar assembly 202 via upper post 204a on input shaft 222. In either case, the phantom presence of an input torque or a distorted input torque causes erroneous input torque data to be provided to the controller from the torque sensor. This erroneous input torque data then causes the controller to send erroneous commands to electric motor 220a causing erroneous output assist torque to be applied to output shaft 226. To prevent such a torque pre-load on electric steering assist unit 220, the vertical position of electric steering assist unit 220 is determined by steering column 204 and not by predetermined mounting points on either of forward spars 214a, 214b such as predrilled holes in forward spars 214a, 214b or pre-welded supports on forward spars 214a, 214b.

In the present embodiment, floating mounting system 240 is used to couple electric steering assist unit 220 to forward spars 214a, 214b. Floating mounting system 240 includes a right floating clamp assemblies 242 that is formed from a right mounting bracket 244 and a right clamp 246, and a left floating clamp assemblies 248 that is formed from a left mounting bracket 250 and a left clamp 252 wherein, clamps 246, 252 are depicted as pillow block clamps. During installation, steering column 204, electric steering assist unit 220 and steering arm assembly 206 are preferably preassembled then positioned along centerline 232 of the snowmobile with lower end 204g of lower post 204b received within a bearing assembly (not visible) of nose truss 214o and upper post 204a received on a forward side of steering column mount 254, as best seen in FIG. 4F. Right mounting bracket 244 and left mounting bracket 250 may be part of the preassembly or may be bolted on to outer housing 230 of electric steering assist unit 220 after steering column 204, electric steering assist unit 220 and steering arm assembly 206 have been received by forward frame assembly 214. In either case, once coupled to electric steering assist unit 220, right mounting bracket 244 aligns with a nonpredetermined location 256 of right-forward spar 214a and left mounting bracket 250 aligns with a nonpredetermined location 258 of left-forward spar 214b.

Next, right clamp 246 is used to couple right mounting bracket 244 to right-forward spar 214a at nonpredetermined location 256 and left clamp 252 is used to couple left mounting bracket 250 to left-forward spar 214b at nonpredetermined location 258, as best seen in FIG. 4G. In the clamped orientation, outer housing 230 is fixed against rotation relative to forward frame assembly 214. As nonpredetermined locations 256, 258 that clamps 246, 252 couple brackets 244, 250 to spars 214a, 214b are not constrained by predrilled holes or pre-welded supports, torque pre-load caused by misalignment of electric steering assist unit 220 is prevented. Specifically, due to manufacturing tolerances and/or assembly tolerances associated with forward frame assembly 214, predrilled holes or pre-welded supports could deviate from the design position by enough to cause misalignment of electric steering assist unit 220 that introduces torque pre-load on electric steering assist unit 220 when electric steering assist unit 220 is coupled to spars 214a, 214b at such predrilled holes or pre-welded supports. The use of floating mounting system 240 prevents such misalignment, and thus torque pre-load on electric steering assist unit 220 when electric steering assist unit 220 is coupled to spars 214a, 214b. It should be noted that the vertical position of clamp 246 on spar 214a is different than, and in this case higher than, the vertical position of clamp 252 on spar 214*b*. In the illustrated embodiment, once electric steering assist unit 220 is clamped to spars 214*a*, 214*b*, electric motor 220*a* of electric steering assist unit 220 is positioned forward of spars 214*a*, 214*b*, as best seen in FIG. 4D. In addition, electric steering assist unit 220 is positioned forward of engine 280, as best seen in FIG. 4C, wherein engine 280 is depicted as an aftwardly tilted two-stroke engine that has air intake inlets and exhaust outlets on the forward side of engine 280.

In the illustrated clamped position, electric motor 220*a* of electric steering assist unit 220 is positioned generally above engine 280, forward of muffler 282, above inlets 284*a*, 284*b* of an exhaust system and/or within a curved portion of exhaust pipe 286. More specifically, an exhaust manifold 288, including inlets 284*a*, 284*b*, is coupled to the forward side of engine 280. Exhaust pipe 286 is coupled to a forward side of exhaust manifold 288. Exhaust pipe 286 includes a first portion 286*a* that extends forward of engine 280 and between spars 214*a*, 214*b* to a point forward of electric steering assist unit 220. Exhaust pipe 286 also includes a second portion 286*b* that extends from first portion 286*a* outboard of spar 214*b*, to a location aftward of electric steering assist unit 220 and to the left side of centerline 232. Exhaust pipe 286 further includes a third portion 286*c* that extends from second portion 286*b* aftward of electric steering assist unit 220 to a location to the right side of centerline 232 and outboard of spar 214*a*. As best seen in FIG. 4B, third portion 286*c* of exhaust pipe 286 is at least partially above electric steering assist unit 220. Muffler 282 is coupled to third portion 286*c* with muffler 282 secured to forward frame assembly 214 outboard of spar 214*a* such that a forwardmost portion of muffler 282 is positioned forward of an aftwardmost portion of electric steering assist unit 220. In addition, electric steering assist unit 220 is positioned above exhaust manifold 288. Further, at least a portion of electric steering assist unit 220 is positioned forward of aftward mounting point 270*b*, 274*b* of upper A-arms 270, 274 and forward of aftward mounting point 272*b*, 276*b* of lower A-arms 272, 276.

Referring now to FIGS. 5A-5F of the drawings, an embodiment of a steering system for a snowmobile, such as snowmobile 10, will now be discussed. Steering system 300 includes a handlebar assembly 302, a steering column 304, a steering arm assembly 306, a right tie rod 308, a left tie rod 310, a right ski assembly 312 including a right spindle 312*a* and a right ski 312*b*, and a left ski assembly 318 including a left spindle 318*a* and a left ski 318*b*. In addition, steering system 300 includes an electric steering assist unit 320. Steering system 300 is coupled to a forward frame assembly 314 that includes a right-forward spar 314*a*, a left-forward spar 314*b*, a right-aft spar 314*c*, a left-aft spar 314*d*, right truss 314*e*, a left truss 314*f*, a right-upper beam 314*g*, a left-upper beam (not installed in the illustrated embodiment), a right-lower beam 314*i*, a left-lower beam 314*j*, an upper cross member 314*k* and a nose frame assembly 314*m* including a nose rail 314*n* and a nose truss 314*o*. Plate members 316*a*, 316*b* are coupled to and preferably welded to forward frame assembly 314 such that forward frame assembly 314 and plate members 316*a*, 316*b* form a welded frame assembly. Right ski assembly 312 is coupled to forward frame assembly 314 by an upper A-arm 370 at forward and aftward mounting points 370*a*, 370*b* and by a lower A-arm 372 at forward and aftward mounting points 372*a*, 372*b*. Likewise, left ski assembly 318 is coupled to forward frame assembly 314 by an upper A-arm 374 at forward and aftward mounting points 374*a*, 374*b* and by a lower A-arm 376 at forward and aftward mounting points 376*a*, 376*b*.

In the illustrated embodiments, steering column 304 is a bent steering column formed from an upper post 304*a* that is positioned aft of upper cross member 314*k*, a handlebar post 304*b* that is coupled to upper post 304*a* via a universal joint 304*c* and a lower post 304*d*. Handlebar post 304*b* of steering column 304 has an upper end coupled to handlebar assembly 302 via a handlebar bracket 302*a*. A lower end of upper post 304*a* includes a splined coupler that receives an input shaft that has input splines therein to couple the lower end of upper post 304*a* to electric steering assist unit 320. Lower post 304*d* of steering column 304 has an upper end that includes a splined coupler that receives an output shaft that has output splines therein to couple the upper end of lower post 304*d* to electric steering assist unit 320. Steering arm assembly 306 is coupled to lower end 304*e* of lower post 304*d*. Steering arm assembly 306 is coupled to the proximal ends tie rods 308, 310. The distal ends of tie rods 308, 310 are respectively coupled to ski assemblies 312, 318 such that rotation of handlebar assembly 302 by the rider of the snowmobile, together with the assist of electric steering assist unit 320, causes ski assemblies 312, 318 to pivot, thus turning the snowmobile. Lower end 304*e* of lower post 304*d* is received within a bearing assembly (not visible) of nose truss 314*o* such that lower post 304*d* is operable to rotate relative thereto.

Electric steering assist unit 320 includes an outer housing 330 that contains the working components thereof including, for example, an electric motor 320*a*, a torque sensor, a controller and a torsion bar that couples the input shaft to the output shaft of electric steering assist unit 320. In operation, the input torque applied from handlebar assembly 302 via handlebar post 304*b* and upper post 304*a* on the input shaft of electric steering assist unit 320 is measured by the torque sensor. Input torque data is then provided to the controller from the torque sensor. Based upon the input torque data and additional factors such as the speed of the snowmobile, the controller commands electric motor 320*a* to provide an output assist torque to the output shaft of electric steering assist unit 320 that is additive to the input torque applied to the output shaft from the input shaft via the torsion bar. The use of electric steering assist unit 320 improves the handling of the snowmobile, reduces fatigue associated with driving the snowmobile and can allow the snowmobile to be driven more aggressively. In addition, using steering system 300 that has a common axis of rotation 330 (see FIG. 5D) shared by steering column 304, electric steering assist unit 320 and steering arm assembly 306 that is positioned along a centerline 332 (see FIG. 5B) of the snowmobile, reduces the number of parts required in steering system 300 and reduces the complexity of steering system 300, which improves the overall reliability of the snowmobile.

To prevent a torque pre-load on electric steering assist unit 320, the present embodiment utilizes a floating mounting system 340 to couple electric steering assist unit 320 to forward spars 314*a*, 314*b*. Floating mounting system 340 includes a right floating clamp assemblies 342 that is formed from a right mounting bracket 344 and a right clamp 346, and a left floating clamp assemblies 348 that is formed from a left mounting bracket 350 and a left clamp 352 wherein, clamps 346, 352 are depicted as pillow block clamps. During installation, steering column 304, electric steering assist unit 320 and steering arm assembly 306 are preferably preassembled then positioned along centerline 332 of the snowmobile with lower end 304*e* of lower post 304*d* received within a bearing assembly (not visible) of nose truss 314o and handlebar post 304b received on an aftward side of steering column mount 354, as best seen in FIG. 5E. Right mounting bracket 344 and left mounting bracket 350 may be part of the preassembly or may be bolted on to outer housing 330 of electric steering assist unit 320 after steering column 304, electric steering assist unit 320 and steering arm assembly 306 have been received by forward frame assembly 314. In either case, once coupled to electric steering assist unit 320, right mounting bracket 344 aligns with a nonpredetermined location 356 of right-forward spar 314a and left mounting bracket 350 aligns with a nonpredetermined location 358 of left-forward spar 314b.

Figure 5A:
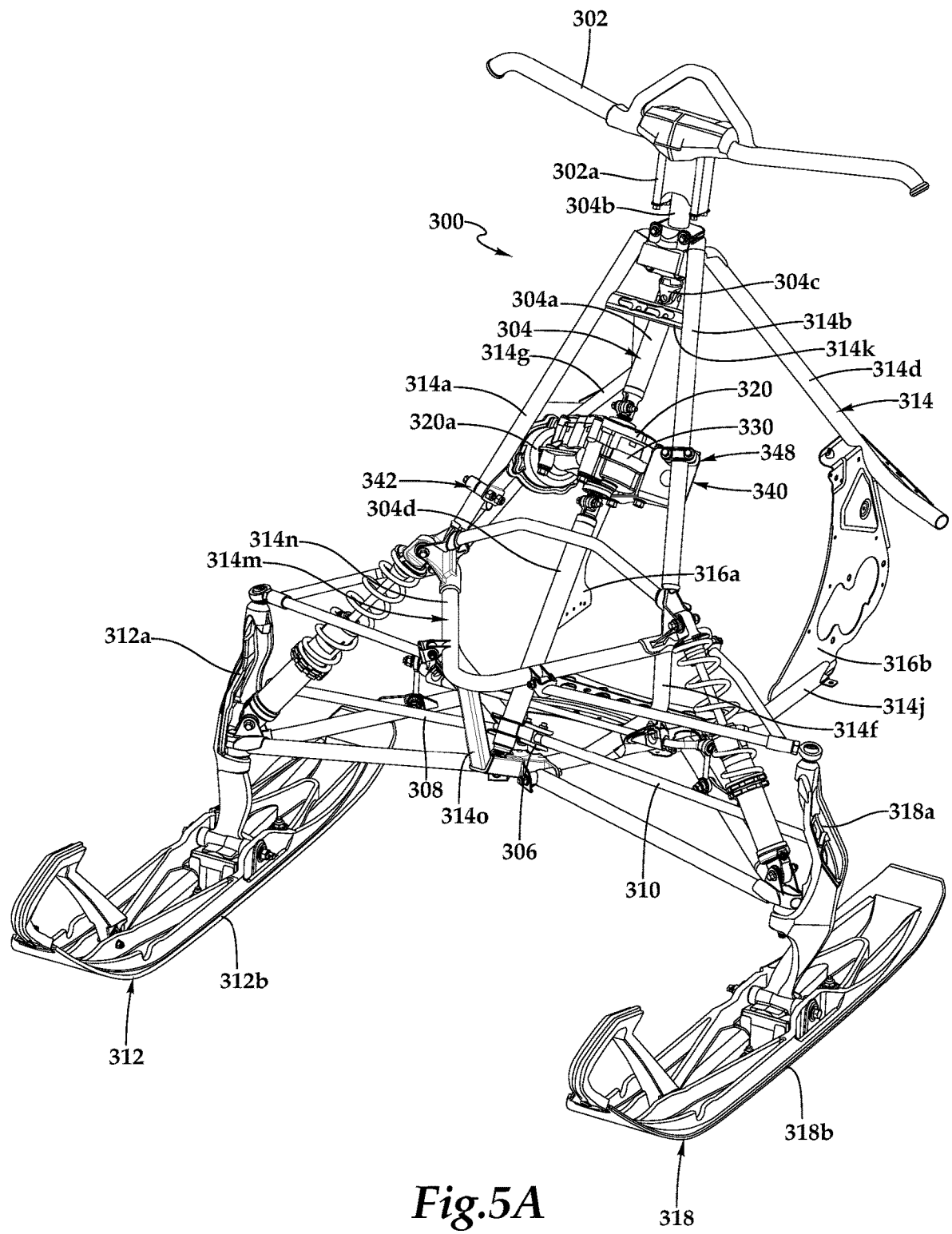
Figure 5B:
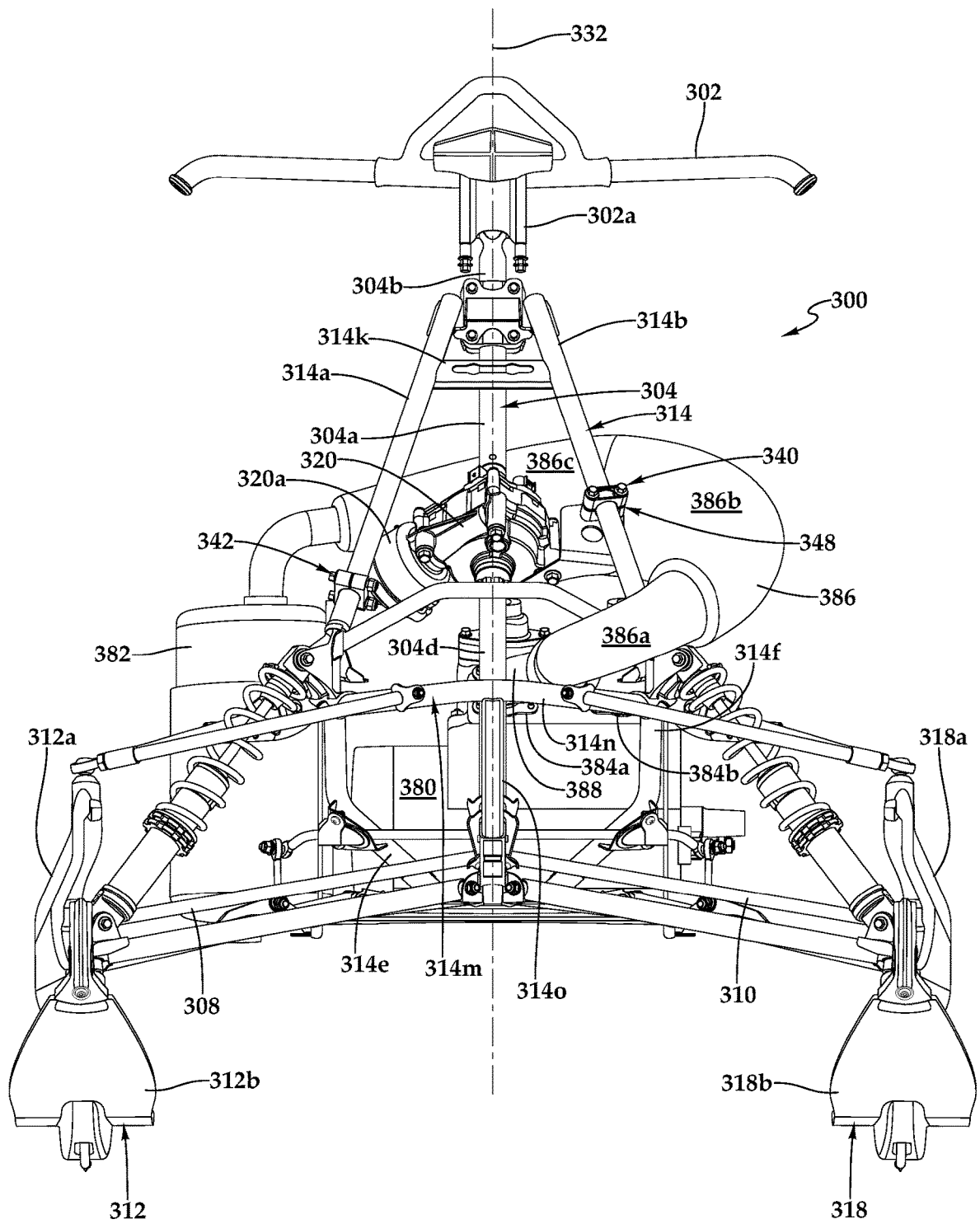
Figure 5C:
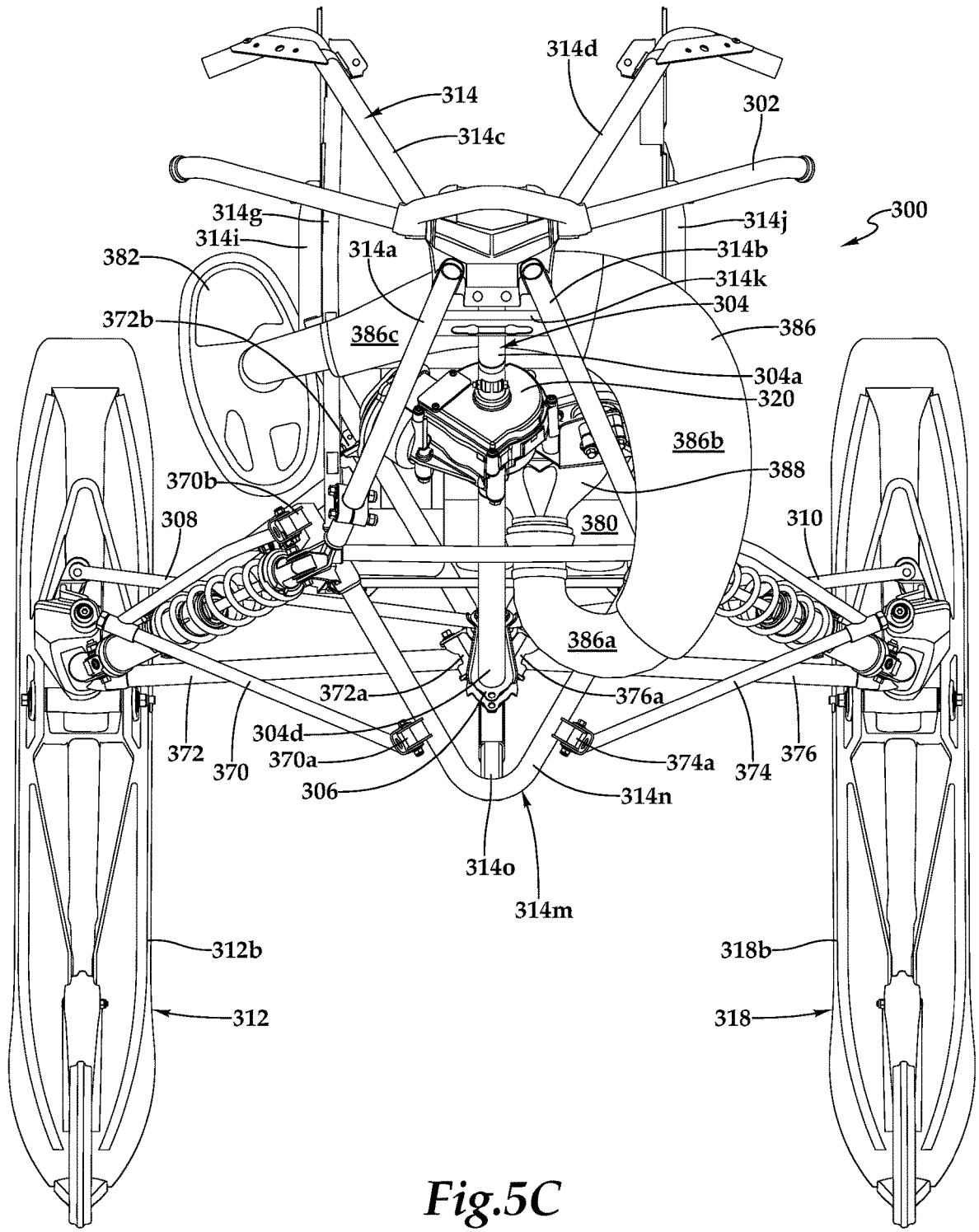
Figure 5D:
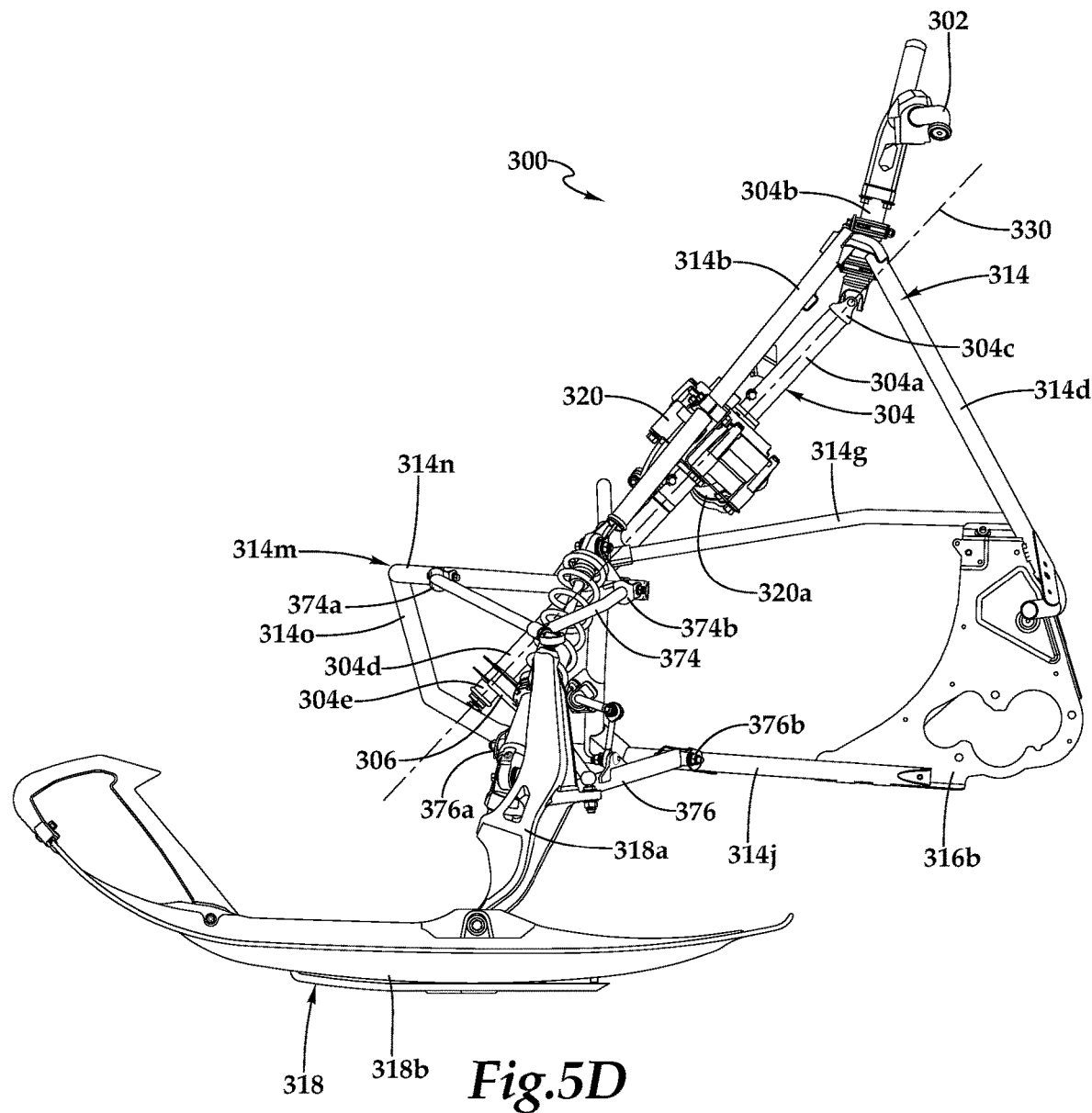

Next, right clamp 346 is used to couple right mounting bracket 344 to right-forward spar 314a at nonpredetermined location 356 and left clamp 352 is used to couple left mounting bracket 350 to left-forward spar 314b at nonpredetermined location 358, as best seen in FIG. 5F. In the clamped orientation, outer housing 330 is fixed against rotation relative to forward frame assembly 314. As nonpredetermined locations 356, 358 that clamps 346, 352 couple brackets 344, 350 to spars 314a, 314b are not constrained by predrilled holes or pre-welded supports, torque pre-load caused by misalignment of electric steering assist unit 320 is prevented. It should be noted that the vertical position of clamp 346 on spar 314a is different than, and in this case lower than, the vertical position of clamp 352 on spar 314b. In the illustrated embodiment, once electric steering assist unit 320 is clamped to spars 314a, 314b, electric steering assist unit 320 is positioned aftward of spars 314a, 314b, as best seen in FIG. 5D. In addition, electric steering assist unit 320 is positioned forward of engine 380, as best seen in FIG. 5C, wherein engine 380 is depicted as an aftwardly tilted two-stroke engine that has air intake inlets and exhaust outlets on the forward side of engine 380.

In the illustrated clamped position, electric motor 320a of electric steering assist unit 320 is positioned generally above engine 380, between muffler 382 and steering column 304, above inlets 384a, 384b of an exhaust system and/or closer to an outlet of exhaust pipe 386 than inlets 384a, 384b. More specifically, an exhaust manifold 388, including inlets 384a, 384b, is coupled to the forward side of engine 380. Exhaust pipe 386 is coupled to a forward side of exhaust manifold 388. Exhaust pipe 386 includes a first portion 386a that extends forward of engine 380 and between spars 314a, 314b to a point forward of electric steering assist unit 320. Exhaust pipe 386 also includes a second portion 386b that extends from first portion 386a outboard of spar 314b, to a location aftward of electric steering assist unit 320 and to the left side of centerline 332. Exhaust pipe 386 further includes a third portion 386c that extends from second portion 386b aftward of electric steering assist unit 320 to a location to the right side of centerline 332 and outboard of spar 314a. As best seen in FIG. 5B, third portion 386c of exhaust pipe 386 is at least partially above electric steering assist unit 320. Muffler 382 is coupled to third portion 386c with muffler 382 secured to forward frame assembly 314 outboard of spar 314a such that a forwardmost portion of muffler 382 is positioned forward of an aftwardmost portion of electric steering assist unit 320. In addition, electric steering assist unit 320 is positioned above exhaust manifold 388. Further, at least a portion of electric steering assist unit 320 is positioned forward of aftward mounting point 372b, 376b of lower A-arms 372, 376.

Forward frame assembly 214 of FIGS. 4A-4G and forward frame assembly 314 of FIGS. 5A-5F may represent a common forward frame assembly used as part of multiple snowmobile models that have different configurations. As illustrated herein, for example, steering system 200 of FIGS. 4A-4G includes straight steering column 204 that is positioned forward of upper cross member 214k and forward of steering column mount 254 that may be preferable for high performance snowmobiles while steering system 300 of FIGS. 5A-5F includes a bent steering column 304 that is positioned aft of upper cross member 314k and aft of steering column mount 354 that may be preferable for mountain snowmobiles.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A steering system for a snowmobile having a forward frame assembly with first and second forward spars, the steering system comprising:
    a handlebar assembly;
    a steering column having an upper end coupled to the handlebar assembly, the steering column including upper and lower posts;
    an electronic steering assist unit coupled to the steering column between the upper and lower posts;
    a steering arm assembly coupled to a lower end of the lower post;
    first and second ski assemblies;
    a first tie rod having a proximal end coupled to the steering arm assembly and a distal end coupled to the first ski assembly;
    a second tie rod having a proximal end coupled to the steering arm assembly and a distal end coupled to the second ski assembly; and
    a floating mounting system coupling the electronic steering assist unit to the first and second forward spars, the floating mounting system configured to prevent torque pre-load on the electronic steering assist unit;
    wherein, the steering column and the electronic steering assist unit share a common axis of rotation that is positioned along a centerline of the snowmobile.

2. The steering system as recited in claim 1 wherein, the steering column is a straight steering column.

3. The steering system as recited in claim 1 wherein, the steering column is a bent steering column having a universal joint.

4. The steering system as recited in claim 1 wherein, the forward frame assembly includes an upper cross member; and
    wherein, the steering column is positioned forward of the upper cross member.

5. The steering system as recited in claim 1 wherein, the forward frame assembly includes an upper cross member; and
    wherein, the steering column is positioned aft of the upper cross member.

6. The steering system as recited in claim 1 wherein, the electronic steering assist unit includes an electric motor; and
    wherein, the electric motor is positioned forward of the first and second forward spars.

7. The steering system as recited in claim 1 wherein, the electronic steering assist unit includes an electric motor; and
    wherein, the electric motor is positioned aft of the first and second forward spars.

8. The steering system as recited in claim 1 wherein, the electronic steering assist unit has an outer housing; and
    wherein, the floating mounting system prevents rotation of the outer housing relative to the first and second forward spars.

9. The steering system as recited in claim 1 wherein, the floating mounting system further comprises first and second floating clamp assemblies that respectively couple the electronic steering assist unit to the first and second forward spars at first and second nonpredetermined locations to allow the steering column to determine a vertical position of the electronic steering assist unit relative to the first and second forward spars.

10. The steering system as recited in claim 9 wherein, the first floating clamp assembly further comprises a first bracket and a first clamp, the first clamp coupled to the first forward spar at the first nonpredetermined location, the first bracket coupled between the first clamp and the electronic steering assist unit; and
    wherein, the second floating clamp assembly further comprises a second bracket and a second clamp, the second clamp coupled to the second forward spar at the second nonpredetermined location, the second bracket coupled between the second clamp and the electronic steering assist unit.

11. The steering system as recited in claim 10 wherein, the first clamp is positioned at a different vertical position than the second clamp.

12. The steering system as recited in claim 10 wherein, the first and second clamps are pillow block clamps.

13. The steering system as recited in claim 1 wherein, the electronic steering assist unit includes an input shaft coupled to the upper post of the steering column and an output shaft coupled to the lower post of the steering column.

14. The steering system as recited in claim 13 wherein, the input shaft of the electronic steering assist unit further comprises input splines; and
    wherein, the upper post of the steering column is coupled to the input splines of the electronic steering assist unit with a splined coupler.

15. The steering system as recited in claim 13 wherein, the output shaft of the electronic steering assist unit further comprises output splines; and
    wherein, the lower post of the steering column is coupled to the output splines of the electronic steering assist unit with a splined coupler.

16. A snowmobile comprising:
a chassis including a forward frame assembly with first and second forward spars;
an engine coupled to the forward frame assembly;
a handlebar assembly;
a steering column having an upper end coupled to the handlebar assembly, the steering column including upper and lower posts;
an electronic steering assist unit coupled to the steering column between the upper and lower posts;
a steering arm assembly coupled to a lower end of the lower post;
first and second ski assemblies;
a first tie rod having a proximal end coupled to the steering arm assembly and a distal end coupled to the first ski assembly;
a second tie rod having a proximal end coupled to the steering arm assembly and a distal end coupled to the second ski assembly; and
a floating mounting system coupling the electronic steering assist unit to the first and second forward spars, the floating mounting system configured to prevent torque pre-load on the electronic steering assist unit;
wherein, the steering column and the electronic steering assist unit share a common axis of rotation that is positioned along a centerline of the snowmobile.

17. The snowmobile as recited in claim 16 wherein, the engine is a two-stroke engine.

18. The snowmobile as recited in claim 16 wherein, the electronic steering assist unit has an outer housing; and
    wherein, the floating mounting system prevents rotation of the outer housing relative to the first and second forward spars.

19. The snowmobile as recited in claim 16 wherein, the floating mounting system further comprises first and second floating clamp assemblies that respectively couple the electronic steering assist unit to the first and second forward spars at first and second nonpredetermined locations to allow the steering column to determine a vertical position of the electronic steering assist unit relative to the first and second forward spars.

20. The snowmobile as recited in claim 16 wherein, the first floating clamp assembly further comprises a first bracket and a first clamp, the first clamp coupled to the first forward spar at the first nonpredetermined location, the first bracket coupled between the first clamp and the electronic steering assist unit; and
    wherein, the second floating clamp assembly further comprises a second bracket and a second clamp, the second clamp coupled to the second forward spar at the second nonpredetermined location, the second bracket coupled between the second clamp and the electronic steering assist unit.

\* \* \* \* \*